US008666388B2

(12) United States Patent
Catovic et al.

(10) Patent No.: US 8,666,388 B2
(45) Date of Patent: Mar. 4, 2014

(54) GEOGRAPHIC-BASED MEASUREMENT AND LOGGING OF RADIO COVERAGE RELATED INFORMATION BY MOBILE DEVICES

(75) Inventors: Amer Catovic, San Diego, CA (US); Oronzo Flore, Ostuni (IT); Rajarshi Gupta, Santa Clara, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 680 days.

(21) Appl. No.: 12/698,773

(22) Filed: Feb. 2, 2010

(65) Prior Publication Data

US 2010/0197239 A1  Aug. 5, 2010

Related U.S. Application Data

(60) Provisional application No. 61/149,543, filed on Feb. 3, 2009.

(51) Int. Cl.
*H04W 24/00* (2009.01)

(52) U.S. Cl.
USPC ........................................ 455/423; 455/67.11

(58) Field of Classification Search
USPC ......... 455/456.1, 423, 446, 456.6, 425, 67.11
See application file for complete search history.

(56) References Cited

U.S. PATENT DOCUMENTS

| | | | | |
|---|---|---|---|---|
| 6,041,236 A | * | 3/2000 | Bernardin et al. | 455/446 |
| 6,606,494 B1 | * | 8/2003 | Arpee et al. | 455/422.1 |
| 6,834,180 B1 | * | 12/2004 | Marshall | 455/67.11 |
| 7,970,394 B2 | * | 6/2011 | Behroozi et al. | 455/423 |
| 8,050,670 B2 | * | 11/2011 | Buyse | 455/423 |
| 8,060,102 B2 | * | 11/2011 | Gazzola | 455/446 |
| 2003/0087635 A1 | * | 5/2003 | Sheffield | 455/423 |
| 2006/0007901 A1 | | 1/2006 | Roskowski et al. | |
| 2010/0069070 A1 | * | 3/2010 | Shi et al. | 455/436 |
| 2011/0106942 A1 | | 5/2011 | Roskowski et al. | |

FOREIGN PATENT DOCUMENTS

| | | |
|---|---|---|
| EP | 1424863 A1 | 6/2004 |
| JP | 2008512047 A | 4/2008 |
| KR | 20070088481 A | 8/2007 |
| WO | WO9533352 A2 | 12/1995 |
| WO | WO2006063309 | 6/2006 |
| WO | 2007005030 A2 | 1/2007 |

OTHER PUBLICATIONS

International Search Report and Written Opinion—PCT/US2010/023088, International Search Authority—European Patent Office—Jul. 29, 2010.
Taiwan Search Report—TW099103212—TIPO—May 28, 2013.

* cited by examiner

*Primary Examiner* — Lewis West
(74) *Attorney, Agent, or Firm* — Kam T. Tam

(57) ABSTRACT

Providing for automated wireless network signal analysis by mobile devices as a function of their geographic locations is described herein. By way of example, a wireless network can transmit a set of geographic data defining a geographic region to a mobile device. The mobile device can compare its current location to the geographic region, and begin measuring downlink signals, or recording such measurements when within the geographic region, and terminate the recording when the mobile device leaves the geographic region. Recorded measurements can be subsequently uploaded to the wireless network for analysis. In some aspects, the mobile device can refrain from uploading the measurements until within a defined reporting region. By providing mobile device network analysis triggered on device geographic location, analysis data that is well tailored to a particular problem area can be obtained, increasing quality of the analysis data and significantly reducing cost of acquiring such data.

57 Claims, 17 Drawing Sheets

GEOGRAPHIC-BASED MEASUREMENT AND LOGGING OF RADIO COVERAGE RELATED INFORMATION BY MOBILE DEVICES

CLAIM OF PRIORITY UNDER 35 U.S.C. §119

The present application for patent claims priority to Provisional Patent Application Ser. No. 61/149,543 entitled "METHODS AND APPARATUS FOR CONFIGURING MEASUREMENTS AND LOGGING OF RADIO COVERAGE QUALITY RELATED INFORMATION BY MOBILE DEVICES WITHIN SPECIFIC GEOGRAPHIC AREAS" filed Feb. 3, 2009, and assigned to the assignee hereof and hereby expressly incorporated by reference herein.

BACKGROUND

1. Field

The following description relates generally to wireless communications, and more particularly to facilitating measurement and reporting of radio coverage information based on geographic location of a mobile device.

2. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

A wireless communication network utilizes wireless communication infrastructure (e.g., base station, radio tower, and so forth) that facilitates data exchange with mobile communication devices (e.g., cell phone, smart phone, laptop computer, and so on) on behalf of the wireless communication network. Data received by the wireless communication network can be relayed to another entity, such as another mobile communication device, to a public switched telephone network, to another network such as the Internet, and vice versa, to provide two-way user communication that users come to expect from conventional electronic communication (e.g., telephone service). Caliber of wireless communication generally depends, at least in part, on strength, quality, etc. of wireless signals between the wireless infrastructure and the mobile communication device.

Overall caliber of wireless signals can be affected by many conditions, some static, such as geographic topography, some semi-static, such as man-made structures, and others dynamic, such as atmospheric conditions. One straightforward example is distance to a nearby radio tower. As the distance increases, signal strength decreases. Another example includes physical objects interposed between the mobile communication device and the radio tower. Man-made structures, such as office buildings, towers, and so on, can cause scattering or absorption of wireless signals, reducing communication quality. Further, structures that mitigate propagation of electromagnetic signals, such as electrical conductors and conductive structures (e.g., metal walls or enclosures, conductive insulation, and so on) can also reduce strength or quality of wireless signals. As yet another example, geographic topography can reduce signal strength, and cause signal reflections or scattering that produce wireless interference. Further to the above, weather patterns, mid and large-scale electromagnetic fluctuations of the Earth, and other atmospheric conditions can affect wireless signal quality. Accordingly, depending on static and dynamic conditions, a wireless network's capability of providing quality service can vary dramatically based on geographic location.

In order to provide reliable wireless services for a wide range of locations, wireless network providers periodically test signal strength and quality of wireless infrastructure, including radio towers and base stations, wireless repeaters, wireless relays, and so on. One example test is a drive through test. A drive through test typically involves network personnel moving throughout a geographic region on foot or in/on a vehicle. While conducting the test, the network personnel employ a wireless receiver to analyze strength and quality of downlink signals at various locations, and identify poor service areas. Data pertaining to these poor service areas can be recorded and provided to network engineers to determine an appropriate solution. Sometimes these solutions involve adding additional wireless infrastructure, such as a low power base station within a high rise building, or a set of such base stations within a shopping mall, or the like. In other cases, adjusting position, orientation or transmit power of existing infrastructure can correct the problem. Although various solutions exist, conducting drive through tests to identify problem areas can be very costly, especially for large wireless networks that are thousands or even tens of thousands of square miles in area. On the other hand, failure to identify these problem areas can lead to poor customer satisfaction, and loss of business or loss of reputation. These types of losses can be significant, particularly if widespread. Accordingly, network operators have a strong incentive to provide seamless network service, even if the cost of doing so is high.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

The subject disclosure provides for automated wireless network signal analysis by mobile devices as a function of their geographic locations. In some aspects, network control protocols can be extended to enable transmission of a set of geographic data defining a geographic region to a mobile device. The mobile device can employ position location determination techniques to compare its current location to the geographic region. When the mobile device enters the geographic region, it can begin measuring downlink signals or recording such measurements. Recorded measurements are subsequently uploaded to the wireless network for analysis. In this manner, a wireless network operator can obtain data analysis for the problem area without conducting time-consuming and expensive drive through tests, for instance. In some aspects, a set of data defining a reporting region can be sent to the mobile device, and the mobile device can refrain from uploading the measurements unless the mobile device is within the reporting region. In other aspects, geographic data or measurements are exchanged over user plane protocols, via a remote client-server interaction at the wireless network and mobile device that employs these user plane protocols. In either case, by providing mobile device network analysis triggered on device geographic location, analysis data that is well tailored to a particular problem area can be obtained, increasing quality of network analysis data and significantly reducing cost of acquiring such data.

According to particular aspects of the subject disclosure, provided is a method of wireless communication. The method can comprise employing a communication interface to forward data defining a geographic region to a user equipment (a UE) operating within a wireless network, wherein the data defines the geographic region with geographic coordinates that are independent of wireless network infrastructure. Moreover, the method can comprise employing the communication interface to forward a trigger policy to the UE that causes the UE to record or log signal measurements of the wireless network when the UE is within the geographic region and generate a set of signal measurements.

According to other aspects, disclosed is an apparatus configured for wireless communication. The apparatus can comprise a communication interface for electronic communication with a wireless management network and with a wireless transceiver, and memory for storing wireless protocols for sending data to or receiving data from a UE via the wireless transceiver. Furthermore, the apparatus can comprise a data processor for executing modules configured to implement the wireless protocols. Specifically, the modules can comprise a data management module that obtains or generates a set of geographic data defining a geographic region and a set of reporting data defining a reporting region. The modules can also comprise a command module that sends the set of geographic data and the set of reporting data to the UE via the wireless transceiver to cause the UE to record a set of measurements of wireless network signals when the UE is within the geographic region, and upload the set of measurements when the UE is within the reporting region.

According to additional aspects of the subject disclosure, provided is an apparatus configured for wireless communication. The apparatus can comprise means for employing a communication interface to forward data defining a geographic region to a UE operating within a wireless network, wherein the data defines the geographic region independent of wireless network infrastructure. Additionally, the apparatus can comprise employing the communication interface to forward a trigger policy to the UE that causes the UE to record or log signal measurements of the wireless network when the UE is within the geographic region and generate a set of signal measurements.

In another aspect is disclosed at least one data processor configured for wireless communication. The processor(s) can comprise a module that forwards data defining a geographic region to a UE operating within a wireless network, wherein the data defines the geographic region independent of wireless network infrastructure. Moreover, the processor(s) can comprise a module that forwards a trigger policy to the UE that causes the UE to record or log signal measurements of the wireless network when the UE is within the geographic region and generate a set of signal measurements.

In yet another aspect is disclosed a computer program product comprising a computer-readable medium. The computer-readable medium can comprise code for causing a computer to forward data defining a geographic region to a UE operating within a wireless network, wherein the data defines the geographic region independent of wireless network infrastructure. In addition, the computer-readable medium can comprise code for causing the computer to forward a trigger policy to the UE that causes the UE to record or log signal measurements of the wireless network when the UE is within the geographic region and generate a set of signal measurements.

In additional aspects of the subject disclosure, provided is a method of wireless communication. The method can comprise employing a wireless transceiver to obtain a set of geographic data that defines a geographic region independent of base station infrastructure of a wireless network. The method can also comprise employing a data processor to analyze data indicating a location of a UE and comparing the location to the geographic region. Moreover, the method can comprise employing the data processor to initiate signal analysis measurements of the wireless network if the UE is within the geographic region and recording a set of signal measurements for uploading to a wireless network.

In another aspect is provided an apparatus configured for wireless communication. The apparatus can comprise a communication interface that employs a wireless transceiver for obtaining a set of geographic data that defines a geographic region and a set of reporting data that defines a reporting region, wherein the geographic region is at least in part different from the reporting region. Additionally, the apparatus can comprise memory for storing modules configured to provide position dependent signal analysis for the apparatus and a data processor for executing the modules. According to particular aspects, the modules can comprise a measurement module that performs a data analysis of received wireless signals and a comparison module that monitors data providing a position location of the apparatus and that compares the position location to the geographic region. In at least one aspect, the modules can also comprise a triggering module that causes the measurement module to initiate an analysis of downlink signals when the position location is within the geographic region.

In yet other aspects disclosed is an apparatus for wireless communication. The apparatus can comprise means for employing a wireless transceiver to obtain a set of geographic data that defines a geographic region independent of base station infrastructure of a wireless network. Moreover, the apparatus can comprise means for employing a data processor to analyze data indicating a location of a UE and comparing the location to the geographic region. Further to the above, the apparatus can comprise means for employing the data processor to initiate signal analysis measurements of the wireless network if the UE is within the geographic region and recording a set of signal measurements for uploading to a wireless network.

According to one or more additional aspects, disclosed is at least one data processor configured for wireless communication. The processor(s) can comprise a module that obtains a set of geographic data that defines a geographic region independent of base station infrastructure of a wireless network.

Furthermore, the processor(s) can comprise a module that analyzes data indicating a location of a user equipment (a UE) and comparing the location to the geographic region. According to at least one aspect, the processor(s) can also comprise a module that initiates signal analysis measurements of the wireless network if the UE is within the geographic region and recording a set of signal measurements for uploading to a wireless network.

Further to the above, one or more other aspects disclose a computer program product comprising a computer-readable medium. The computer-readable medium can comprise code for causing a computer to obtain a set of geographic data that defines a geographic region independent of base station infrastructure of a wireless network. Moreover, the computer-readable medium can comprise code for causing the computer to analyze data indicating a location of a UE and comparing the location to the geographic region. In at least one further aspect, the computer-readable medium can comprise code for causing the computer to initiate signal analysis measurements of the wireless network if the UE is within the geographic region and recording a set of signal measurements for uploading to a wireless network.

According to at least one further aspect, the subject disclosure describes a computer program product comprising a computer-readable medium. The computer-readable medium can comprise code for causing a computer to obtain timing information pertaining to a non-serving frequency of a wireless network. Moreover, the computer-readable medium can comprise code for causing the computer to inspect the timing information to identify subframe configuration data pertaining to the non-serving frequency. In addition to the foregoing, the computer-readable medium can comprise code for causing the computer to employ a subframe configuration utilized by network cells on the non-serving frequency for analyzing signals thereof.

DETAILED DESCRIPTION

Figure 1:
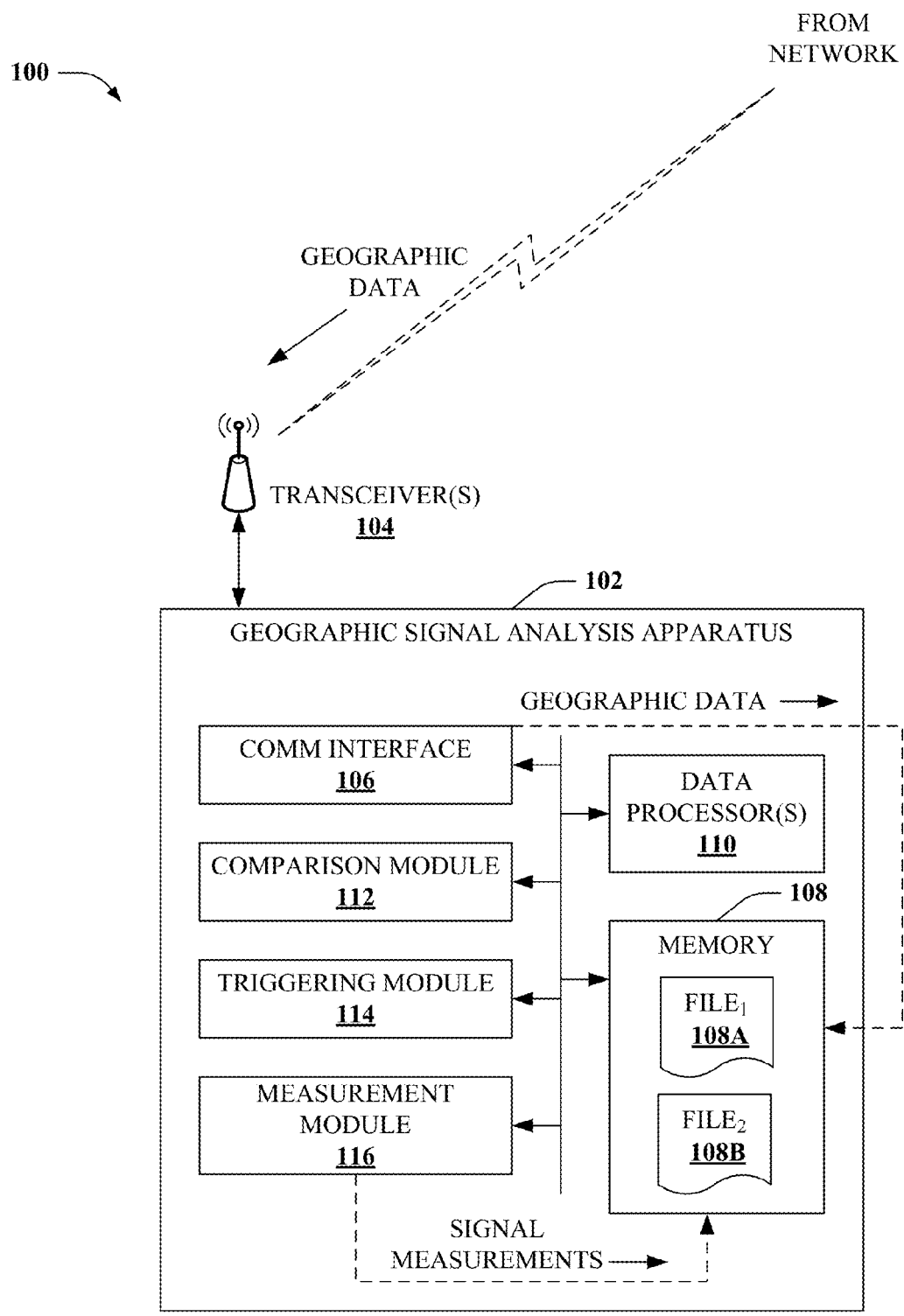
FIG. 1 illustrates a block diagram of an example geographic-based signal analysis apparatus according to aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing geographically triggered signal analysis and reporting. One skilled in the art should appreciate that similar techniques could apply to other communication environments.

Wireless communication systems achieve electronic communication between remotely located wireless nodes through local infrastructure deployments and central networks that communicatively couple local infrastructure (e.g., a base station). In general, the local infrastructure can utilize various principles to exchange wireless information with these nodes. But each case depends on establishing a wireless link between a transmitter of the wireless node and a receiver of the local infrastructure or base station, and vice versa. For multiple access systems, the wireless link involves a transmitter-receiver pair coordinating a set of orthogonal wireless resources (e.g., frequency subband, time subslot, code-spread factor, and so on), employed by the wireless node and local infrastructure. By transmitting or decoding signals only on the set of orthogonal wireless resources, data transmitted on one wireless link (set of resources employed by a transmitter-receiver pair) can be distinguished from data transmitted on other wireless links (sets of resources employed by other transmitter-receiver pairs). Furthermore, each transmitter-receiver pair employing a distinct wireless link forms a distinct spatial channel, also referred to as a wireless channel, or signal dimension.

FIG. 1 illustrates a block diagram of an example system 100 comprising a wireless link between a wireless network (not depicted) and a remote wireless transceiver 104. The wireless network can include wireless infrastructure or a wireless communication interface such as a base station, radio tower, wireless access point, and so on. Wireless transceiver 104 can comprise any suitable wireless communication device remotely located from the wireless network infrastructure or communication interface. Examples can include a mobile device, cellular telephone, desktop computer, laptop computer, personal digital assistant (PDA), game station, wireless access terminal, and so forth. In addition, the wireless link between the wireless network and wireless transceiver 104 can based on various wireless communication protocols, including for instance, frequency division multiple access (FDMA) protocols, code division multiple access (CDMA) protocols, time division multiple access (TDMA) protocols, orthogonal frequency division multiplex (OFDM) protocols, or the like, or a suitable combination thereof, in conjunction with one or more wireless communication systems (e.g., wideband CDMA, high speed packet access [HSPA], third generation partnership project [3GPP] long term evolution [LTE], advanced LTE [LTE-A], worldwide interoperability for microwave access [WiMAX], WiFi networks, including 802.11x, etc.).

As depicted, wireless transceiver 104 is communicatively coupled to a geographic signal analysis apparatus 102. The geographic signal analysis apparatus 102 comprises a communication interface 106 for sending and receiving wireless data by way of wireless transceiver 104. Particularly, communication interface 106 can employ wireless transceiver 104 for obtaining a set of geographic data that defines a geographic region. In at least one aspect of the subject disclosure, communication interface 106 can further employ wireless transceiver 104 for obtaining a set of reporting data that defines a reporting region, wherein the geographic region is at least in part different from the reporting region.

In some aspects of the subject disclosure, the set of geographic data is transmitted over the wireless link using a control plane protocol (e.g., a radio resource control [RRC] protocol extended to carry the set of geographic data). This control plane protocol can broadcast the set of geographic data via a broadcast channel, in at least one such aspect, or can unicast the set of geographic data via a unicast channel, in another such aspect.

Alternatively, the set of geographic data can be transmitted over the wireless link using user plane protocols. In the latter case, a client application (not depicted) employed by geographic signal analysis apparatus 102 can interface with a server application on the wireless network (or vice versa) based on the user plane protocols. The set of geographic data can be transmitted in application level data packets generated per the user plane protocols, for instance.

The set of geographic data can be stored by communication interface 106 in memory 108. In one aspect, memory 108 can store the set of geographic data in a geographic data file, file$_1$ 108A. Furthermore, memory 108 can also be for storing modules configured to provide position dependent signal analysis for geographic signal analysis apparatus 102 based at least in part on the set of geographic data. Geographic signal analysis apparatus 102 can employ a data processor for executing the modules, to implement the position dependent signal analysis as described below.

Further to the above, geographic signal analysis apparatus 102 can comprise a measurement module 116 that performs a data analysis of received wireless signals. The data analysis can comprise signal strength analysis, signal quality analysis, or a suitable combination thereof or of the like. More specific examples of this data analysis can include signal strength, quality of signal strength, quality of highest level analysis, call drop rate, setup success rate, throughput, or other suitable metrics of signal strength or quality. It should be appreciated that measurement module 116 can perform different types of signal analysis, or be configured to analyze different types of signals, depending on wireless protocols employed by wireless transceiver 104. For instance, in a W-CDMA or a universal mobile telecommunication system (UMTS) system, measurement module 116 can employ a received signal code power (RSCP) level analysis for determining quality of signal strength. As another example, in an LTE system, measurement module 116 can employ a reference signal received power (RSRP analysis for determining quality of signal strength. Other suitable analysis of various network signals can be employed as well, which are suited to a wireless system.

In addition to the foregoing, geographic signal analysis apparatus 102 can comprise a comparison module 112 that monitors data providing a position location of geographic signal analysis apparatus 102 and that compares the position location to the geographic region. The position location can be, for instance, independent of wireless network infrastructure or data that implies or is associated with a position location of the wireless network infrastructure (e.g., a set of base station identifiers [IDs] that are correlated with a position location of respective base stations of the set). Examples of such position location can include global positioning system (GPS) coordinates, navigational device coordinates in latitude and longitude for instance, or other suitable position location data that provides a position of geographic signal analysis apparatus 102 independent of position location of any wireless infrastructure providing wireless services to wireless transceiver 104.

In at least one aspect of the subject disclosure, comparison module 112 can obtain position location information of geographic signal analysis apparatus 102 that is associated with a position of wireless network infrastructure. In this case, the position location information can comprise one or more base station IDs, where the base station IDs indicate a position location of a base station serving wireless transceiver 104, and can be used to approximate the position location of geographic signal analysis apparatus 102. Further, comparison module 112 can compare this approximated position location of geographic signal analysis apparatus 102 to the geographic region provided by the set of geographic data (which can also, e.g., comprise a set of base station IDs for defining the geographic region).

Where the set of geographic data and the position location information of geographic signal analysis apparatus 102 is in a common format, the set of geographic data and the position location can be compared directly by comparison module 112. Where the data and information are in different formats, comparison module 112 can be configured to perform one or more data conversions on the data or the information so that the data and information are in comparable formats. In one instance, comparison module 112 can convert GPS data to latitude or longitude positioning data, or to one or more base station IDs that at least in part intersect the geographic region. Other suitable data conversions can be employed as well. For instance, latitude or longitude positioning data can be converted to GPS data, or to the one or more base station IDs, and so on. Thus, if the geographic data is in GPS coordinates, and the position location information is in latitude and longitude coordinates, comparison module 112 can convert the GPS coordinates to latitude and longitude coordinates, or vice versa, before comparing the respective positioning coordinates.

After comparing the position location information and geographic region, comparison module 112 determines whether geographic signal analysis apparatus 102 is within the geographic region. The determination can be made, for instance, on whether the position location information and geographic region overlap. If so, comparison module 112 updates a triggering module 114 indicating that geographic signal analysis apparatus 102 is within the geographic region. If, on the other hand, comparison module 112 determines that the position location information and geographic region do not overlap, triggering module 114 can be updated with this information also.

In addition to the foregoing, comparison module 112 can compare the position location information to a reporting region defined by a set of reporting data, if such data is received from the wireless network. In such case, comparison module 112 determines whether geographic signal analysis apparatus 102 is within the reporting region based on the comparison of position location information and the reporting region. Based on this comparison, comparison module 112 updates triggering module as to whether or not geographic signal analysis apparatus 102 is within the reporting region or not.

Triggering module 114 can be configured in a manner that causes measurement module 116 to initiate an analysis of downlink signals, or recording or logging of the analysis of downlink signals, when the position location is within the geographic region. Accordingly, triggering module 114 initiates the data analysis or recording/logging of wireless network signals when geographic signal analysis apparatus 102 is within the geographic region. Particularly, results of the data analysis can be stored in a second file, file$_2$ 108B in memory 108. In one aspect, recorded/logged signal analysis can be uploaded to the network by geographic signal analysis apparatus 102. In another aspect, geographic signal analysis apparatus 102 refrains from uploading results of the signal analysis to the wireless network, until within the reporting region, as determined by comparison module 112. Accordingly, wireless signal analysis can be performed or recorded only when geographic signal analysis apparatus 102 is within a geographic region provided by the set of geographic data. In one option, results of the analysis can be uploaded to the network immediately, or at a suitable time after analysis is complete. In an alternative option, however, results of the analysis are uploaded only when geographic signal analysis apparatus 102 enters a reporting region provided by the wireless network. In the latter case, managed reporting can be provided by the network, reducing uplink interference, network congestion, and so forth.

As described, geographic signal analysis apparatus 102 can facilitate greatly improved downlink signal analysis for wireless networking. First, geographic signal analysis apparatus 102 can reduce or eliminate a need to perform manual drive through tests by wireless network personnel. Instead, a network operator can identify problem areas within geographic regions covered by the operator's wireless network infrastructure (e.g., radio towers, base stations, etc.), create sets of data defining these geographic regions, and send these sets of data to mobile devices communicatively coupled with the wireless network infrastructure. Such a mobile device can be updated, either through hardware updates, software updates, firmware updates, or the like or a combination thereof, to include geographic signal analysis apparatus 102, or a similar such apparatus providing similar functions as that described herein (e.g., see FIG. 8, supra). Accordingly, the mobile device can employ geographic signal analysis apparatus 102 to receive and process the set of geographic data, and begin measuring or recording/logging network signal measurements when the mobile device enters the geographic region defined by the set of geographic data. In such a manner, the mobile device can mitigate or obviate a need for personnel of the wireless operator to conduct tedious drive through tests, for instance, dramatically reducing cost and time associated with obtaining signal analysis data for the problem areas within the geographic regions.

Further to the above, it should be appreciated that, in addition to mitigating or obviating a need for manual drive through tests to obtain signal analysis for network problem areas, geographic signal analysis apparatus 102 can also accommodate detailed and granular definitions of a geographic region, further enhancing problem area analysis. This detail and precision can be provided with a set of GPS coordinates, or navigational latitude and longitude coordinates, or the like or a suitable combination thereof, for instance, that define geographic points which can form an enclosed region of geographic space (e.g., by connecting the geographic points). For instance, if a geographic problem area can be defined with high resolution and precision, a higher likelihood exists that automated signal analysis data provided by geographic signal analysis apparatus 102 will be well tailored to the geographic problem area itself. Of course, network data that is well-tailored to a particular area is very useful in characterizing conditions within that area, and can also be more useful in determining substandard performance within the area, or useful to deriving a solution to increase performance.

According to still other aspects, geographic signal analysis apparatus 102 can be configured for targeted reporting. The targeted reporting can be employed to reduce uplink network loading or interference, for instance. As an example to illustrate the effectiveness of targeted reporting, consider a large number of mobile devices, having received a set of geographic data defining a problem geographic area, and entering the problem geographic area and recording signal analysis measurements as described herein. If these mobile devices upload results of their respective measurements concurrently, they could significantly encumber uplink channels of a wireless network. To mitigate this problem, a set of reporting data defining one or more reporting regions can be distributed to these mobile devices. In this case, the mobile devices can refrain from uploading the results of their respective measurements until they are within the reporting region. Thus, if the reporting region is outside the geographic region, or optionally dispersed throughout nearby cells of the wireless network, network loading associated with the uploading can be spread among more base stations and more wireless uplink channels. In at least one aspect, different reporting regions can be distributed to different sets of mobile devices, to limit an amount of uplink traffic that will occur in any given reporting region as a result of the uploading.

In another aspect, one or more preferred reporting regions and one or more default reporting regions can be included in the set of reporting data. In this aspect, a mobile device configured with geographic signal analysis apparatus 102 can refrain from uploading measurement results of the geographic area until the mobile device is within the preferred reporting region(s). If a predetermined condition or set of conditions occur, the geographic signal analysis apparatus 102 can then upload the measurement results anywhere within the default reporting region(s). One example condition to cause uploading within the default reporting region(s) instead of the preferred reporting region can comprise expiration of a preferred reporting time, receiving an upload message from the wireless network (e.g., when network load is below a threshold level), or the like, or a suitable combination thereof. The condition or set of conditions can be configured so that mobile devices will upload measurement results even if they do not enter the preferred reporting region(s), for instance, after the preferred time period expires, or when network load drops below a threshold level, and so on.

In at least one additional aspect of the subject disclosure, the set of geographic data and the set of reporting data can be configured to comprise respective sets of base station IDs for defining a geographic region and reporting region, respectively. Although less detailed than GPS coordinates, employing base station IDs to define the geographic region and reporting region can enable even legacy mobile devices to provide automated downlink signal analysis and reporting, with minimal changes (e.g., with a software update or a firmware update that includes at least a subset of geographic signal analysis apparatus 102). In one particular example, a mobile device can obtain an ID of a serving base station and employ this ID as a proxy for a current location of the mobile device. This ID can be compared with the set of base station IDs defining the geographic region to determine whether this mobile device is within the geographic region (e.g., if the serving base station ID is the same as one of the set of base station IDs defining the geographic region). Likewise, this ID can also be compared with the set of base station IDs defining the reporting region to determine whether this mobile device is within the reporting region. If the mobile device is within the geographic region, the mobile device can begin recording/logging the downlink measurements, as described herein, and likewise if the mobile device is within the reporting region, the mobile device can upload the recorded/logged downlink measurements. The subject disclosure is not limited to the foregoing example, however, as other examples of implementing geographic based signal analysis and reporting are considered within the scope of the subject disclosure.

Figure 2:
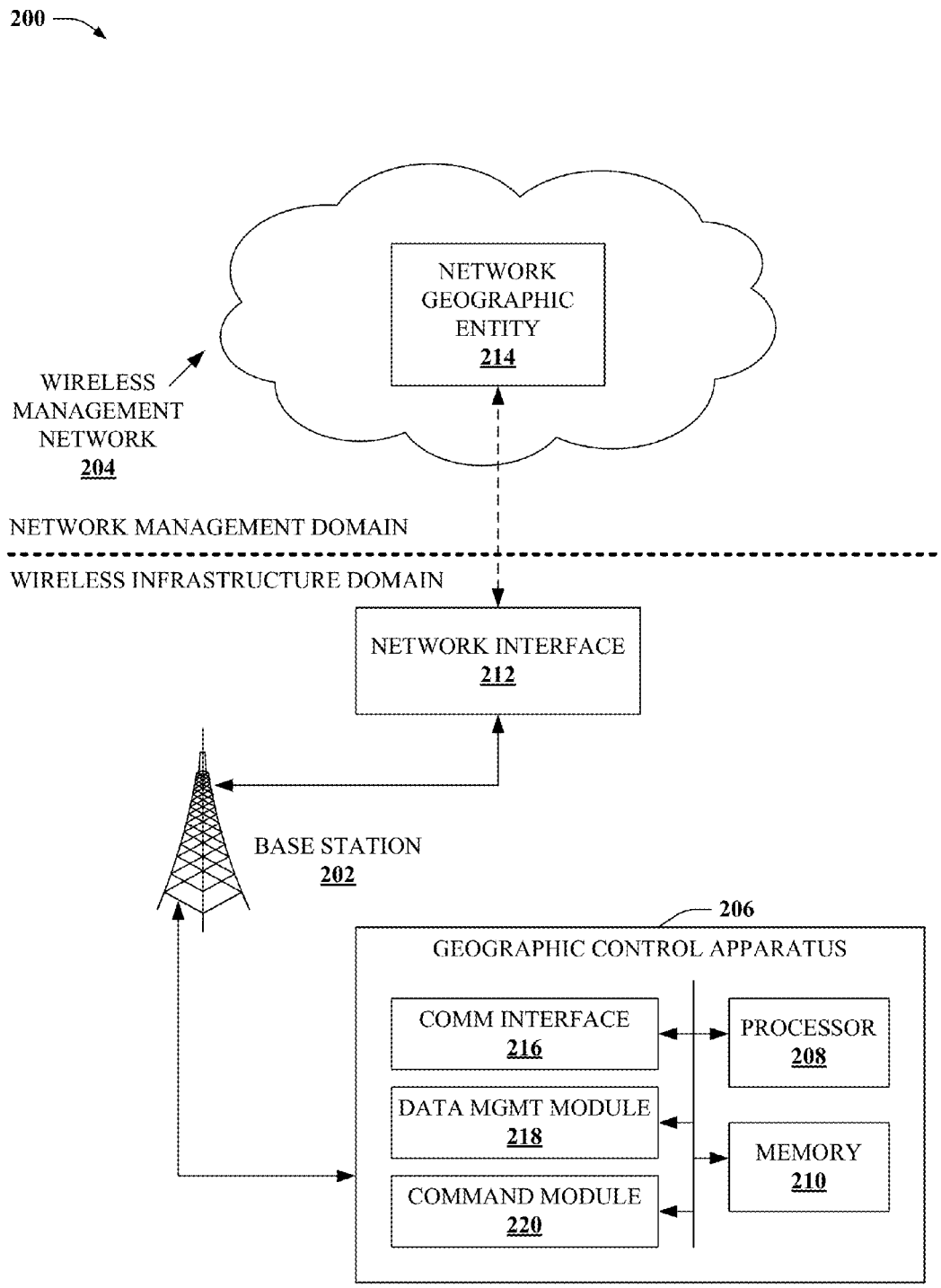
FIG. 2 depicts a block diagram of a sample network-based signal analysis control apparatus according to still other aspects.

FIG. 2 illustrates a block diagram of an example system 200 that provides network managed analysis and reporting of particular geographic regions served by a wireless network, according to one or more aspects of the subject disclosure. System 200 comprises a wireless management network 204 (e.g., a wireless operator's network) communicatively coupled to a wireless base station 202, at least in part via a network interface 212. Wireless management network 204 can comprise a network geographic entity 214, that generates a set of geographic data to define a geographic region served by wireless infrastructure (including e.g., base station 202) serving a wireless network associated with wireless management network 204. The set of geographic data can be forwarded to base station 202 via network interface 212.

Furthermore, network geographic entity 214 can generate a set of reporting data to define a reporting region within the wireless network. In at least one aspect of the subject disclosure, the reporting region can be different from the geographic region. In other aspects, the reporting region can at least in part overlap the geographic region. In still other aspects, the reporting region can comprise a preferred reporting region and a default reporting region, where the preferred reporting region does not overlap the geographic region, and the default reporting region at least in part does overlap the geographic region. In one aspect of the subject disclosure, network geographic entity 214 can forward the set of geographic data and the set of reporting data to base station 202 via a control plane interface employed by network interface 212. In this aspect, network geographic entity 214 can comprise a network manager, a domain manager, or an element manager, or the like, or a suitable combination thereof, and network interface 212 can comprise a control plane management interface. In another aspect of the subject disclosure, wireless management network 204 can be communicatively coupled with a user equipment (UE) via base station 202 and a wireless link between the UE and base station 202 (not depicted, but see FIG. 3, infra). In this aspect, network interface 212 can employ a user plane protocol (e.g., an open mobile alliance device management [OMA-DM] protocol). In this aspect, the set of geographic data and set of reporting data are transferred through base station 202 transparently (with respect to base station 202), via a traffic channel for instance. Further, network interface 212 can comprise a device management server, or other suitable entity in this latter aspect.

In addition to the foregoing, base station 202 can comprise or be coupled with a geographic control apparatus 206. Geographic control apparatus 206 can be configured to distribute the set of geographic data to mobile devices (not depicted) served by base station 202. Particularly, geographic control apparatus 206 can comprise a communication interface 216 for electronic communication with wireless management network 204 and with a wireless transceiver of base station 202. Particularly, communication interface 216 can obtain the set of geographic data or the set of reporting data from network geographic entity 214 by way of base station 202. The respective sets of data can be stored in memory 210 for further processing by geographic control apparatus 206. Additionally, memory 210 can be configured for storing wireless protocols for sending data to or receiving data from a user equipment (a UE—not depicted) via the wireless transceiver of base station 202, and a data processor 208 for executing modules configured to implement the wireless protocols. Further to the above, geographic control apparatus 206 can comprise a data management module 218 that obtains the set of geographic data defining the geographic region and the set of reporting data defining a reporting region from wireless management network 204 via communication interface 216, or from memory 210. In at least one aspect of the subject disclosure, data management module 218 converts the set of geographic data (or the set of reporting data) into a format consistent with location identification capabilities of the UE. For instance, if the UE is configured to analyze GPS coordinates, data management module 218 can convert the set of geographic data or the set of reporting data into GPS coordinates. Data management module 218 is not limited to the foregoing example, however, and can convert the set of geographic data and the set of reporting data from various formats provided by network geographic entity 214 (e.g., GPS coordinates, latitude and longitude coordinates, base station IDs, etc.) into the format consistent with the location identification capabilities of the UE.

In addition to the foregoing, geographic control apparatus 206 can comprise a command module 220 that sends the set of geographic data and the set of reporting data to the UE via the wireless transceiver of base station 202. In at least one aspect, sending the set of geographic data or the set of reporting data can be configured to cause the UE to record a set of measurements of wireless network signals when the UE is within the geographic region, and upload the set of measurements when the UE is within the reporting region. If base station 202 is within the reporting region, and receives the set of measurements from the UE, base station 202 can forward the set of measurements to network geographic entity 214 for analysis by network geographic entity 214, or other suitable component of wireless management network 204 (e.g., a processing component installed by a wireless network operator).

Figure 3:
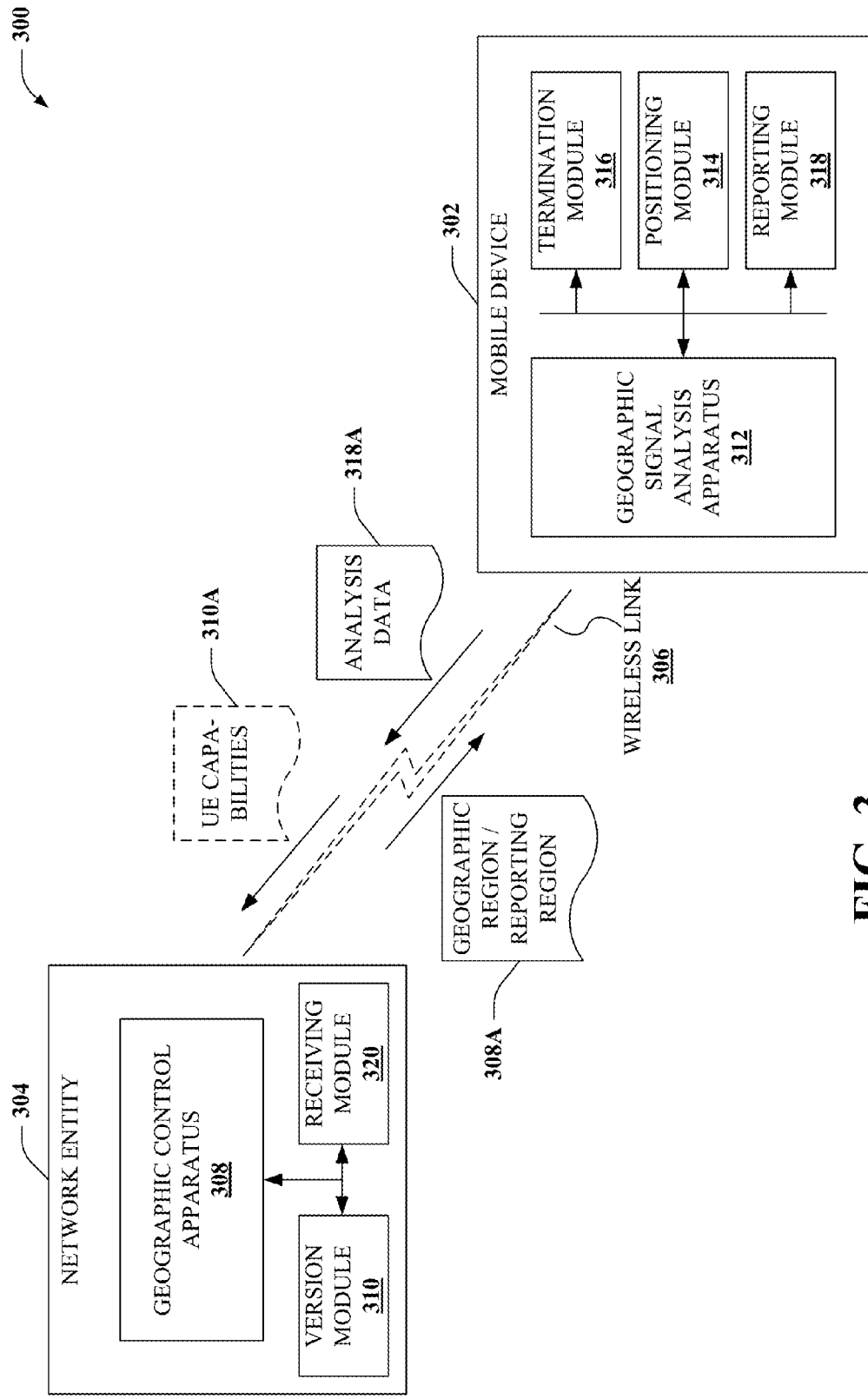
FIG. 3 illustrates a block diagram of a sample wireless communication exchange facilitating geographic-based signal analysis according to particular aspects.

FIG. 3 illustrates a block diagram of an example system 300 for providing geographic-based downlink signal analysis and reporting for a wireless network according to additional aspects of the subject disclosure. System 300 comprises a network entity 304 and a mobile device 302 communicatively coupled by a wireless link 306. Network entity 304 can comprise a base station, wireless relay, wireless repeater, etc., and can optionally comprise one or more components of a wireless management network (e.g., network geographic entity 214). Mobile device 302 can include any suitable mobile wireless communication device, including an access terminal, a UE, a laptop computer, PDA, cellular phone, smartphone, and so forth. As described in more detail below, network entity 304 and mobile device 302 are configured to implement geographic-based signal analysis and reporting provided herein.

Network entity 304 can comprise a geographic control apparatus 308. Geographic control apparatus can be substantially similar to geographic control apparatus 206. However, the subject disclosure is not so limited.

Geographic control apparatus 308 can generate a set of geographic data that defines a geographic region of interest to a wireless network (e.g., where the geographic region of interest is a region associated with customer complaints, relatively high call drop rates, poor throughput, poor signal strength or signal quality strength, or the like, as determined by a network operator). In one aspect of the subject disclosure, the set of geographic data can comprise GPS coordinates that define the geographic region of interest. In other aspects, the set of geographic data can comprise latitude and longitude coordinates that define the geographic region of interest. In at least one other aspect, the set of geographic data can comprise network-dependent coordinates (e.g., a set of base station IDs) that define the geographic region of interest. In at least one particular aspect, the set of geographic data can comprise a combination of the foregoing types of coordinates, or similar coordinates.

In some aspects of the subject disclosure, geographic control apparatus 308 can generate a set of reporting data that defines a reporting region, in addition to or instead of the set of geographic data. Similar to the set of geographic data, the set of reporting data can comprise various data formats to define the reporting region. In one aspect, the set of reporting data can comprise coordinates that are independent of wireless network infrastructure. For instance, the set of reporting data can comprise global positioning system coordinates or latitude and longitude coordinates. In another aspect, the set of reporting data can comprise network-dependent coordinates. Examples of network-dependent coordinates include base station identifiers that are assigned to a cell of a wireless network associated with a defined geographic region, or comprising a base station having a defined position location. The base station identifiers can optionally include a base station identifier of a wireless transceiver associated with network entity 304.

According to particular aspects of the subject disclosure, network entity 304 can comprise a version module 310 that queries mobile device 302 to determine location identification capabilities of mobile device 302. Mobile device 302 can, in some aspects of the subject disclosure, be configured to send an upload message 310A that includes a coordinate system employed by or compatible with mobile device 302. Thus, the location identification capabilities can be based on a GPS coordinate system, latitude and longitude coordinate system, network-dependent coordinate system, or another suitable coordinate system. Version module 310 obtains the upload message 310A from mobile device 302 regarding the location identification capabilities, extracts the coordinate system employed by mobile device 302 there from, and forwards the coordinate system to geographic control apparatus 308. In these aspects of the subject disclosure, geographic control apparatus 308 can be configured to convert converts the set of geographic data or the set of reporting data into a format consistent with the location identification capabilities of mobile device 302 (e.g., from a default coordinate system utilized to generate the set of geographic data or the set of reporting data, into a coordinate system employed by mobile device 302).

Once generated, and optionally converted to be consistent with the location identification capabilities of mobile device 302, geographic control apparatus 308 generates a wireless message 308A comprising the set of geographic data or set of reporting data and transmits the wireless message 308A to mobile device 302. Mobile device 302 can comprise a geographic signal analysis apparatus 312 that obtains wireless message 308A from a wireless transceiver (not depicted) of mobile device 302. In at least one aspect of the subject disclosure, geographic signal analysis apparatus 312 can be substantially similar to geographic signal analysis apparatus 102 of FIG. 1, supra. However, it should be appreciated that the subject disclosure is not limited to this aspect(s).

Upon receiving wireless message 308A, geographic signal analysis apparatus 312 can extract the set of geographic data or the set of reporting data there from. Mobile device 302 can comprise a positioning module 314 that obtains or generates data providing the position location of mobile device 302. In one aspect, positioning module 314 comprises a client application of a GPS device that provides global positioning coordinates for the data providing the position location. In another aspect, positioning module 314 comprises a client application of a navigational device that provides latitude and longitude coordinates for the data providing the position location. In still another aspect, positioning module 314 employs a base station identifier (a base station ID) of a serving base station (e.g., associated with network entity 304) and infers the position location of mobile device 302 from the base station ID.

Geographic signal analysis apparatus 312 can be configured to compare the position location to the geographic region defined by the set of geographic data, or compare the position location to the reporting region defined by the set of reporting data. Based on the comparison(s), geographic signal analysis apparatus 312 can determine whether mobile device 302 is within the geographic region or the reporting region. If within the geographic region, geographic signal analysis apparatus 312 can begin logging signal analysis measurements performed by mobile device 302 of received downlink signals, or trigger such signal analysis measurements, if not already conducted by mobile device 302. Mobile device 302 can further comprise a termination module 316 that causes mobile device 302 to end the analysis of downlink signals, or the logging of signal analysis measurements, when the position location is outside the geographic region.

Signal analysis measurements logged by mobile device 302 are uploaded to network entity 304 in an upload message 318A. To facilitate managed reporting, thereby reducing uplink load to network entity 304 (e.g., within the geographic region), mobile device 302 can comprise a reporting module 318 that uploads the upload message 318A comprising a set of signal analysis data derived from the signal analysis measurements if mobile device 302 is within the reporting region. In one aspect, the reporting region comprises a preferred reporting region and a default reporting region, and optionally a preferred reporting time. In this aspect, reporting module 318 only uploads results of the data analysis if mobile device 302 is within the preferred reporting region or, alternatively, refrains from uploading results of the data analysis if mobile device 302 is not within the preferred reporting region, unless the preferred reporting time has expired and mobile device 302 is within the default reporting region.

According to at least one particular aspect of the subject disclosure, wireless message 308A, upload message 310A and upload message 318A can be transmitted utilizing various network channels associated with wireless link 306. In one aspect, these messages can be transmitted and received via a control plane protocol of a wireless network, such as a RRC protocol. In another aspect, the messages can be transmitted and received utilizing user plane protocols of the wireless network. In the latter case, mobile device 302 or geographic signal analysis apparatus 312 can further comprise a client application (not depicted) that employs a user plane protocol to interface with a network server application included in network entity 304 or geographic control apparatus 308. The server application can generate user plane data packets to form wireless message 308A, and likewise the client application can generate uplink user plane data packets to form upload message 310A and upload message 318A. Thus, the client application extracts the geographic data or the reporting data from within these user plane data packets of wireless message 308A provided by the network server application, and embeds the results of the data analysis into upload message 318A for transmission to the network server application.

Figure 4:
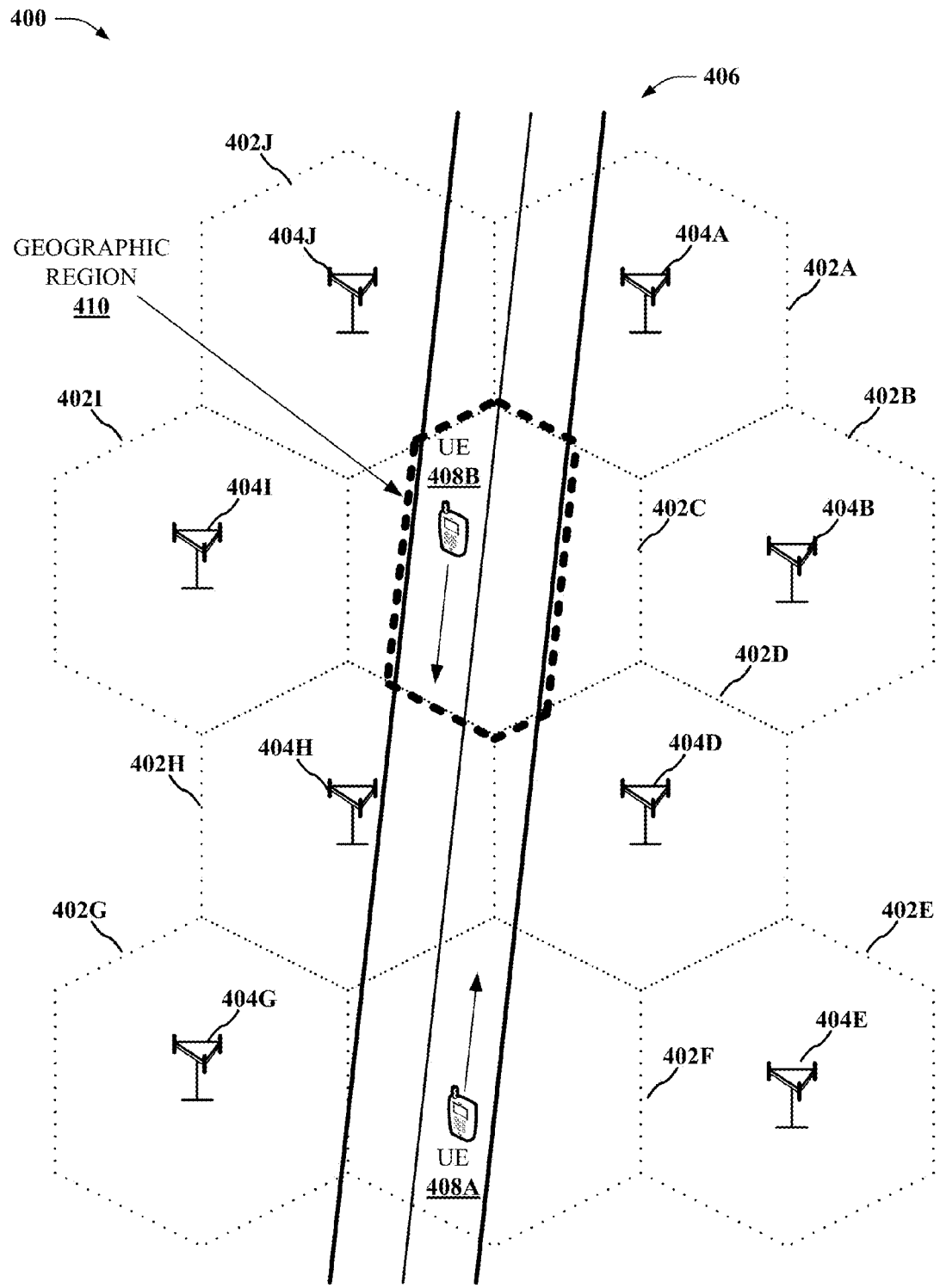
FIG. 4 depicts a diagram of an example geographic region suitable for targeted network signal analysis according to one or more disclosed aspects.

FIG. 4 illustrates a diagram of an example geographic coverage area 400 for a wireless network according to aspects of the subject disclosure. Geographic coverage area 400 is divided into a set of wireless network cells, including cells 402A, 402B, 402C, 402D, 402E, 402F, 402G, 402H, 402I, 402J (referred to collectively as cells 402A-402J) that cover at least a portion of the geographic coverage area 400. Additionally, many of the cells 402A-402J comprise wireless network infrastructure for providing wireless communication services to remote wireless devices. Particularly, a set of base stations, including base stations 404A, 404B, 404D, 404E, 404G, 404H, 404I, 404J (referred to collectively as base stations 404A-404J) are depicted at many of cells 402A-402J. In geographic coverage area 400, a physical structure, such as a road highway 406 is depicted with bold solid lines. This highway 406 intersects several of cells 402A-402J, and further traverses the center of two cells, 402C and 402F. As a result, cells 402C and 402F do not comprise a base station or other infrastructure to provide wireless services within cell 402C. Nearby cells can attempt to service wireless devices within cells 402C and 402F, however the service might be relatively poor, particularly toward the center of these cells 402C, 402F.

For this example, a wireless network operator servicing geographic coverage area 400 generates data defining a geographic region 410 of interest within geographic coverage area 400. This geographic region 410 might be identified as a result of customer complaints, or network-compiled statistics, such as call drop rates, or the like. The wireless network operator can then generate a set of geographic data defining geographic region 410, utilizing GPS coordinates, or latitude and longitude coordinates, or the like, as described herein. The set of geographic data can be forwarded to one or more UEs 408A, 408B within geographic coverage area 400 by one or more of base stations 404A-404J. Upon receiving the set of geographic data, UEs 408A, 408B can compare their current location (e.g., in GPS coordinates or latitude and longitude coordinates) to the set of geographic data defining geographic region 410. Once a UE determines it is within geographic region 410, such as UE 408B, such UE 408B can record or log downlink signal measurements received from one or more of base stations 404A-404J. Results of these downlink signal measurements can then be returned to the network operator in an upload message sent to any suitable base station 404A-404J within the geographic coverage area 400. Accordingly, by employing UEs 408A, 408B for performing signal analysis measurements, significant cost can be alleviated in obtaining these measurements. Furthermore, a well-defined geographic area 410 can be established, limiting the analysis to a well-defined area, and mitigating processing overhead and signaling overhead of UEs 408A, 408B just to a time spent within geographic region 410. Accordingly, signal analysis measurements can be tailored to a particular region that can be well-defined with an accurate coordinate system, preserving network resources as well as UE resources.

Figure 5:
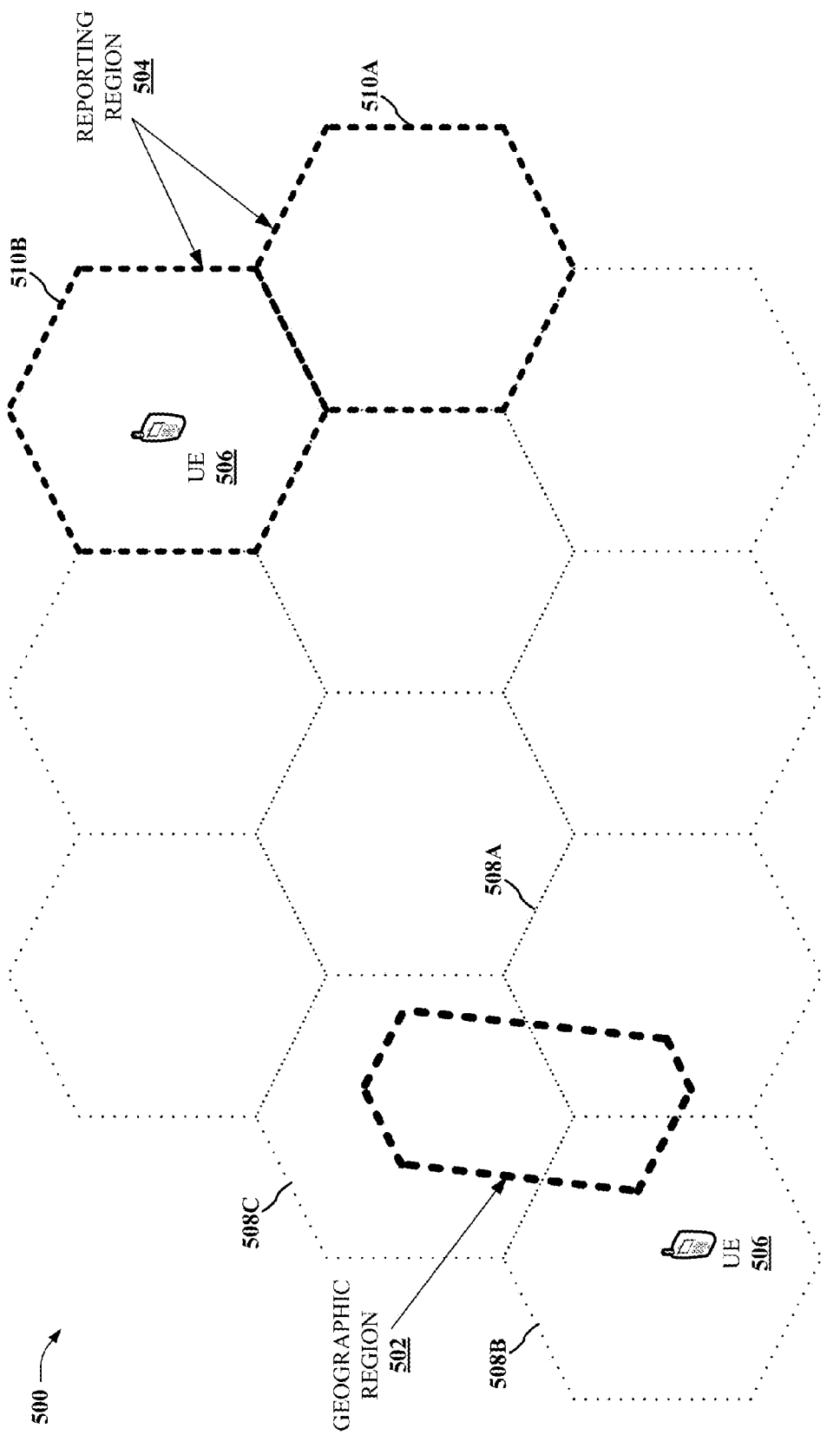
FIG. 5 depicts a diagram of another sample geographic region for targeted network signal analysis according to other aspects.

FIG. 5 illustrates a diagram of an example geographic coverage area 500 according to additional aspects of the subject disclosure. Particularly, geographic coverage area 500 depicts an example of geographic-based network signal analysis, and targeted reporting. Geographic coverage area 500 is divided into a set of wireless network cells, as depicted by the hexagon shaped dashed lines of geographic coverage area 500. Further, three of these wireless network cells, cells 508A, 508B, 508C overlap a geographic region 502 of interest to a wireless network operator providing wireless services to geographic coverage area 500. The geographic region 502 of interest can be a region of poor service quality, as described herein, or having some other characteristic of interest (e.g., a non-operative base station, a region of potential expansion for wireless network infrastructure, and so on). As depicted, the geographic region 502 of interest comprises a portion of cells 508A, 508B, 508C, but not an entirety of any of these cells 508A, 508B, 508C. To define this region, a set of geographic data defining geographic region 502 can employ a coordinate system independent of wireless network infrastructure deployed throughout geographic coverage area 500. This enables geographic region 502 to be defined as a subset of one or more cells, as depicted, rather than all area within the one or more cells. Some examples of such a coordinate system can include a GPS coordinate system, or a navigational coordinate system comprising latitude and longitude information.

As described herein, a network entity can forward the set of geographic data defining the geographic region 502 of interest to a UE 506. UE 506, upon receiving the set of geographic data, can obtain position location information for the UE and determine whether UE 506 is within geographic region 502. Upon entering geographic region 502, UE 506 can begin logging downlink signal measurements for downlink wireless signals received at UE 506. Upon leaving geographic region 502, UE 506 can terminate logging the downlink signal measurements.

In addition to the foregoing, the network entity can forward a set of reporting data defining a reporting region 504. In this case, reporting region 504 comprises two cells 510A, 510B of geographic coverage area 500, although the subject disclosure is not so limited. In other aspects, a reporting region can comprise a subset of one or more cells, similar to geographic region 502, for instance.

Upon entering reporting region 504, UE 506 can upload results of the downlink signal measurements. Typically, this uploading can comprise transmitting the results to a base station serving cell 510B; however, other wireless network interfaces other than a base station can be utilized instead (e.g., a wireless repeater, a wireless relay). By employing both a geographic region 502 and a reporting region 504, a network entity can limit uplink loading for reporting downlink signal measurements. Particularly if geographic region 502 comprises many UEs, for instance. This can facilitate reliable reporting while mitigating uplink network load, if all UEs entering geographic region 502 immediately upload results of respective signal analysis measurements, for instance.

Figure 6:
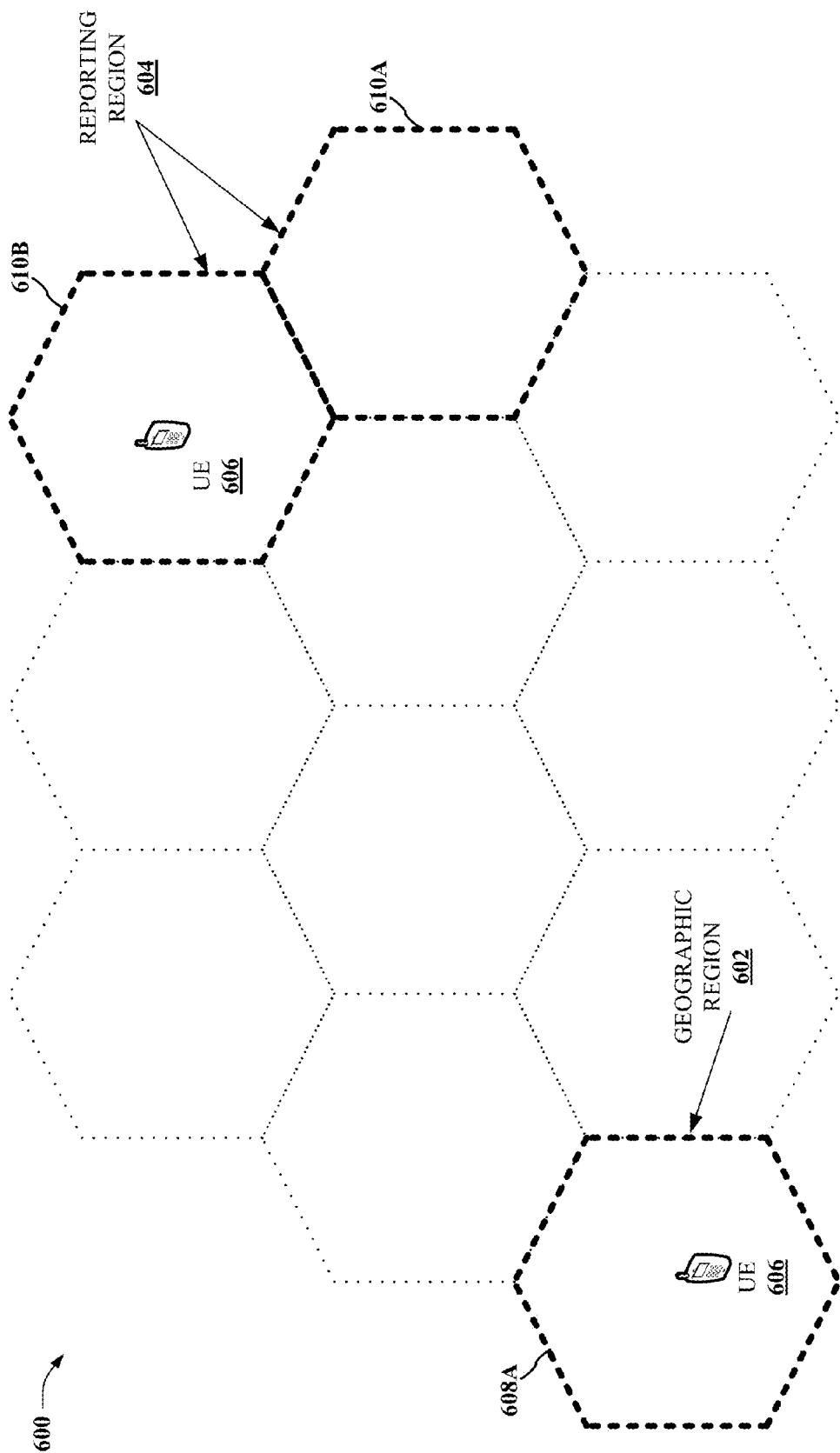
FIG. 6 illustrates a diagram of yet another sample geographic region for targeted network signal analysis, according to still other aspects.

FIG. 6 illustrates a diagram of a sample geographic coverage area 600 according to still other aspects of the subject disclosure. Geographic coverage area 600 includes a geographic region 602 of interest, as well as a reporting region 604. Particularly, geographic region 602 comprises a single cell 608A of geographic coverage area 600, while reporting region 604 comprises two cells 610A, 610B of geographic coverage area 600. Because geographic region 602 and reporting region 604 comprise areas of one or more network cells, a set of geographic data and a set of reporting data defining geographic region 602 and reporting region 604, respectively, can be comprised of respective base station IDs associated with the respective sets of cells 608A and 610A, 610B. As described herein, the set of geographic data and set of reporting data can be forwarded to a UE 606. Upon receiving such data, UE 606 can identify a serving base station ID of a base station serving UE 606, and associate a position location of UE 606 with the serving base station ID (or, e.g., with a position location of the serving base station provided by the serving base station). By comparing the serving base station ID with respective base station IDs of geographic region 602 and reporting region 604, UE 606 can determine whether UE 606 is within geographic region 602 or reporting region 604. In this manner, a legacy device without GPS or other navigational tools can still participate in geographic-based downlink signal measurements and targeted reporting, to facilitate automated network signal analysis. Such a configuration can expand a number of participant UEs in signal analysis and targeted reporting described herein. Further, such a configuration can be accomplished with minimal or no changes to UE 606, as compared with other configurations employing more complex geographic positioning coordinates. Accordingly, the configuration of FIG. 6 provides a cost effective mechanism for accomplishing the signal analysis and targeted reporting.

Figure 7:
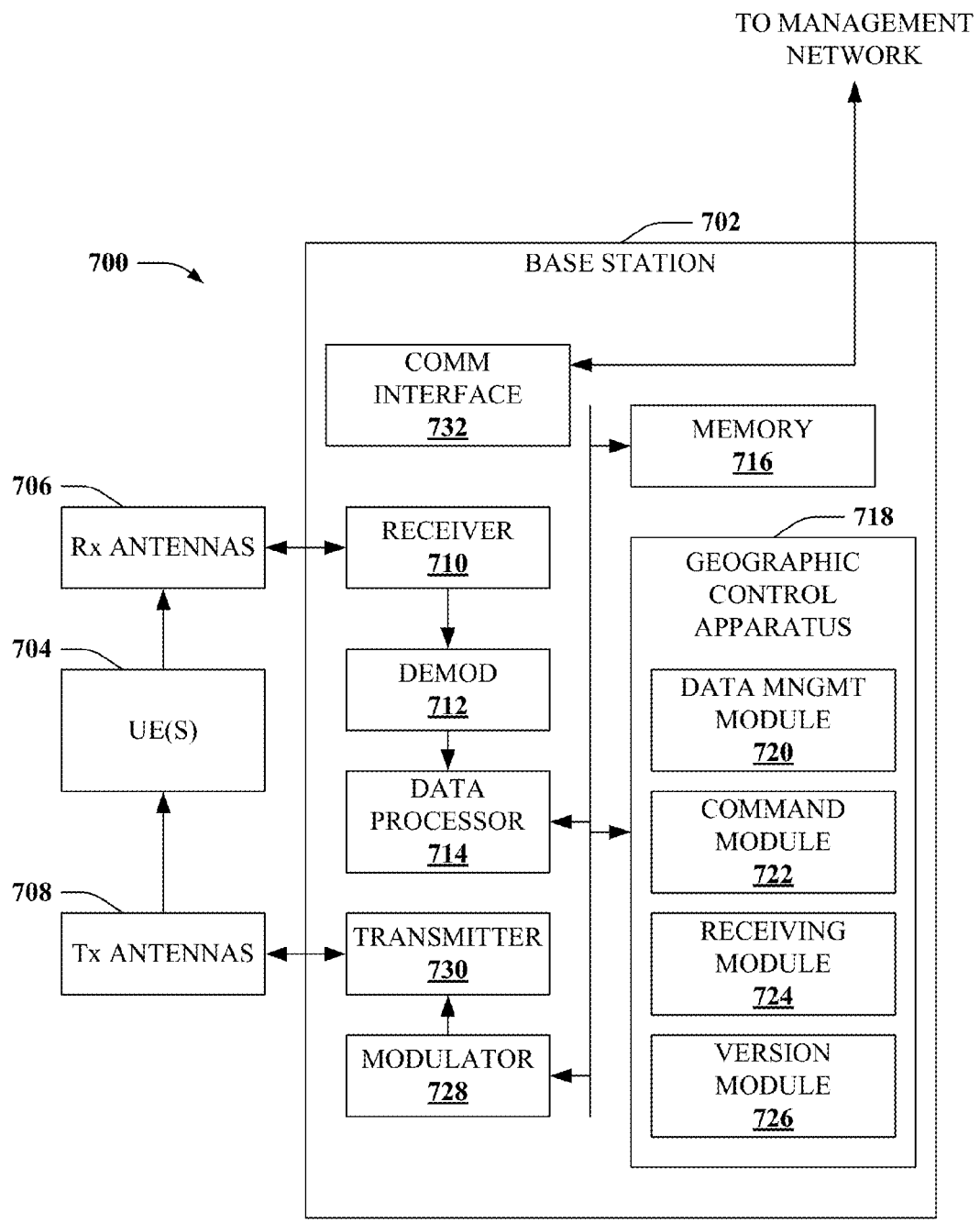
FIG. 7 illustrates a block diagram of an example base station comprising a signal analysis control apparatus according to one or more disclosed aspects.

FIG. 7 illustrates a block diagram of an example system 700 comprising a base station 702 according to particular aspects of the subject disclosure. Base station 702 can be configured to provide geographic-based signal analysis and targeted reporting in a wireless network. Particularly, base station 702 can be configured to manage recording or logging of downlink signal analysis measurements of one or more UEs 704 served by base station 702. By providing such management, base station 702 can accomplish automated signal analysis of geographic regions of interest in a coverage area served by the wireless network.

Base station 702 (e.g., access point, . . . ) can comprise a receiver 710 that obtains wireless signals from UE(s) 704 through one or more receive antennas 706, and a transmitter 730 that sends coded/modulated wireless signals provided by modulator 728 to UE(s) 704 through a transmit antenna(s) 708. Receive antenna(s) 706 and transmit antenna(s) 708, along with receiver 710 and transmitter 730, can comprise a set of wireless transceivers for implementing wireless data exchange with UE(s) 704, as described herein.

Receiver 710 can obtain information from receive antennas 706 and can further comprise a signal recipient (not shown) that receives uplink data transmitted by UE(s) 704. Additionally, receiver 710 is operatively associated with a demodulator 712 that demodulates received information. Demodulated symbols are analyzed by a data processor 714. Data processor 714 is coupled to a memory 716 that stores information related to functions provided or implemented by base station 702.

In particular, base station 702 can comprise a geographic control apparatus 718 configured to define a geographic region of interest or a reporting region for triggering analysis and recording of downlink signals transmitted by base station 702, or another base station of an associated wireless network, and for triggering uploading of results of the analysis, respectively. Particularly, geographic control apparatus 718 can comprise a data management module that obtains a set of geographic data defining a geographic region and a set of reporting data defining a reporting region from a communication interface 732 of base station 702 communicatively coupled with a wireless management network (e.g., a wireless operator associated with base station 702).

Further to the above, geographic control apparatus 718 can comprise a command module 722 that sends the set of geographic data and the set of reporting data to UE(s) 704 via the wireless transceiver of base station 702 to cause UE(s) 704 to record a set of measurements of wireless network signals when the UE is within the geographic region, and upload the set of measurements when the UE is within the reporting region. In one aspect, command module 722 employs a control plane protocol for forwarding the set of geographic data and the set of reporting data to UE(s) 704. In another aspect, command module 722 can employ a user plane protocol for forwarding the set of geographic data and the set of reporting data to UE(s) 704. In this latter aspect, command module 722 can comprise a server application that embeds the set of geographic data and the set of reporting data into application data packets that are sent to UE(s) 704. In an alternative aspect, the server application can be a part of the wireless management network, and command module 722 can simply relay the application data packets comprising the set of geographic data and the set of reporting data to UE(s) 704.

According to still other aspects, command module 722 employs a unicast message to send the set of geographic data and the set of reporting data to UE(s) 704 if UE(s) 704 has an active wireless connection with base station 702. In an alternative aspect, command module 722 employs a broadcast message to send the set of geographic data and the set of reporting data to UE(s) 704 if UE(s) 704 is in an idle state.

Further to the above, geographic control apparatus can comprise a version module 726 that queries UE(s) 704 to determine location identification capabilities of UE(s) 704, and obtains a response from UE(704) regarding the location identification capabilities. In this case, data management module 720 converts the set of geographic data into a format consistent with the location identification capabilities of UE(s) 704. Particularly, the format can comprise GPS coordinates if the location identification capabilities of UE(s) 704 include GPS analysis. Alternatively, the format can comprise latitude and longitude coordinates if the location identification capabilities of the UE include latitude and longitude analysis. As yet another alternative, the format can comprise a set of base station IDs that serve at least a subset of the geographic region if the location identification capabilities of the UE are limited to network-based positioning.

In another aspect, geographic control apparatus 718 can employ a receiving module 724. Receiving module 724 can be configured to receive uplink messages from UE(s) 704 pertaining to the set of geographic data. As one example, receiving module 724 obtains a set of signal measurements from UE(s) 704 via the wireless transceiver of base station 702 if base station 702 is within the reporting region. The set of signal measurements can then be forwarded to the wireless management network via communication interface 732. In at least one aspect, the set of signal measurements are received within a set of application data packets transmitted utilizing user plane protocols employed by base station 702. In this aspect(s), receiving module 724 simply relays the set of application data packets to the wireless management network.

Figure 8:
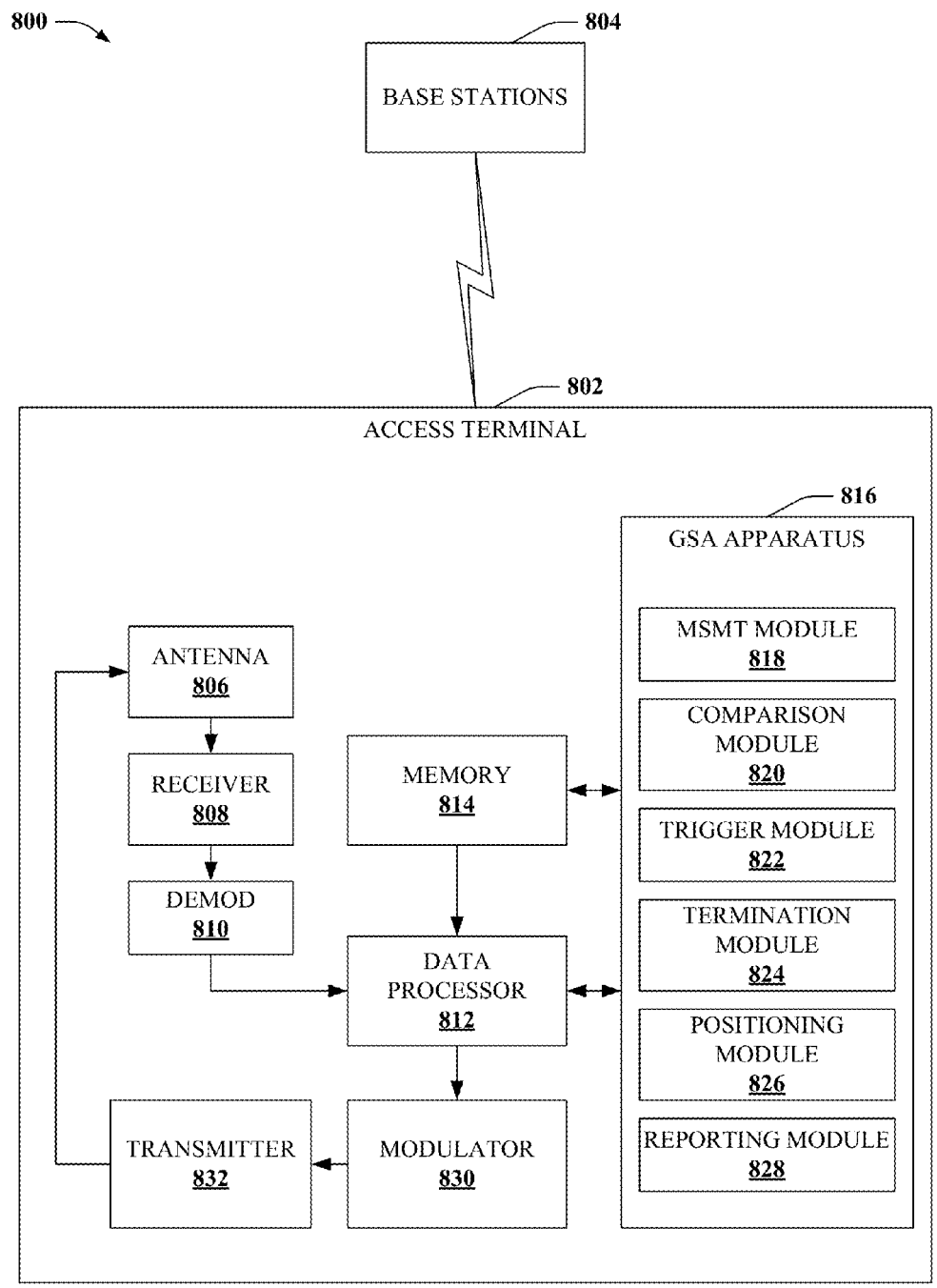
FIG. 8 depicts a block diagram of an example mobile device comprising a geographic-based signal analysis apparatus.

FIG. 8 illustrates a block diagram of an example system comprising an AT 802 configured for wireless communication according to aspects of the subject disclosure. AT 802 can be configured to wirelessly couple with one or more base stations 804 (e.g., access point) of a wireless network. Based on such configuration, AT 802 can receive wireless signals from base station(s) 804 on a forward link channel and respond with wireless signals on a reverse link channel. In addition, AT 802 can comprise instructions stored in memory 814 for analyzing received wireless signals and extracting a set of geographic data defining a geographic region or a set of reporting data defining a reporting region, determining whether AT 802 is within the geographic or reporting region, and performing network signal analysis or reporting of such analysis, or the like, as described herein.

AT 802 includes at least one antenna 806 (e.g., a wireless transmission/reception interface or group of such interfaces comprising an input/output interface) that receives a signal and receiver(s) 808, which performs typical actions (e.g., filters, amplifies, down-converts, etc.) on the received signal. In general, antenna 806 and a transmitter 832 (collectively referred to as a transceiver) can be configured to facilitate wireless data exchange with base station(s) 804. Further, antenna 806, receiver 808, and transmitter 832, as well as demodulator 810 and modulator 830, can form a set of wireless transceivers for implementing the data exchange between base station(s) 804 and AT 802.

Antenna 806 and receiver(s) 808 can be coupled with a demodulator 810 that can demodulate received symbols and provide such signals to a data processor(s) 812 for evaluation. It should be appreciated that data processor(s) 812 can control and/or reference one or more components (antenna 806, receiver 808, demodulator 810, memory 814, geographic signal analysis apparatus 816, modulator 830, transmitter 832) of AT 802. Further, data processor(s) 812 can execute one or more modules, applications, engines, or the like (geographic signal analysis apparatus 816) that comprise information or controls pertinent to executing functions of AT 802. For instance, such functions can include geographic-based downlink signal analysis or targeted reporting, as described herein.

Additionally, memory 814 of AT 802 is operatively coupled to data processor(s) 812. Memory 814 can store data to be transmitted, received, and the like, and instructions suitable to conduct wireless communication with a remote device. Further, memory 814 can be store or be communicatively coupled with geographic signal analysis apparatus 816. Geographic signal analysis apparatus 816 can comprise modules for implementing geographic-based downlink signal analysis and targeted reporting, executed by data processor 812. Particularly, the modules can comprise a measurement module 818 that performs a data analysis of received wireless signals. Further, the modules can comprise a comparison module 820 that monitors data providing a position location of AT 802 and that compares the position location to the geographic region defined by the set of geographic data. A triggering module 822 causes measurement module 818 to initiate an analysis of downlink signals when the position location is within the geographic region. Moreover, a termination module 824 causes measurement module 818 to end the analysis of downlink signals, or recording or logging of the analysis, when the position location is outside the geographic region.

In at least one aspect of the subject disclosure, comparison module 820 further compares the position location to the reporting region and determines whether the apparatus is within the reporting region. In this aspect(s), a reporting module 828 can be employed that uploads a set of signal analysis data derived from the data analysis if the apparatus is within the reporting region. According to a particular aspect, the reporting region comprises a preferred reporting region and a default reporting region, and optionally a preferred reporting time. In such case, reporting module 828 can alternatively perform one of multiple actions. As a first alternative, reporting module 828 uploads results of the data analysis if the apparatus is within the preferred reporting region only. As a second alternative, reporting module 828 refrains from uploading results of the data analysis if the apparatus is not within the preferred reporting region, unless the preferred reporting time has expired. If the preferred reporting time has expired, however, reporting module 828 uploads the results of the data analysis anywhere within the default reporting region.

According to other aspects of the subject disclosure, geographic signal analysis apparatus 816 can comprise a positioning module 826 that obtains or at least in part generates the data providing the position location of AT 802. As one example, positioning module 826 comprises a client application of a GPS device that provides global positioning coordinates for the data providing the position location of AT 802. As another example, positioning module 826 employs a base station identifier (a base station ID) of a serving base station (e.g., base station 804) and infers the position location of AT 802 from the base station ID. In still another example, positioning module 826 comprises a client application of a navigational device that provides latitude longitude coordinates for the data providing the position location of AT 802.

The aforementioned systems or apparatuses have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include AT 802 comprising geographic signal analysis apparatus 102, and base station 702, comprising geographic control apparatus 206, or a different combination of these or other modules. Sub-modules could also be implemented as modules communicatively coupled to other modules rather than included within parent modules. Additionally, it should be noted that one or more modules could be combined into a single module providing aggregate functionality. For instance, data management module 218 can include command module 220, or vice versa, to facilitate obtaining geographic data and reporting data and sending such data to a UE by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 9-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 9:
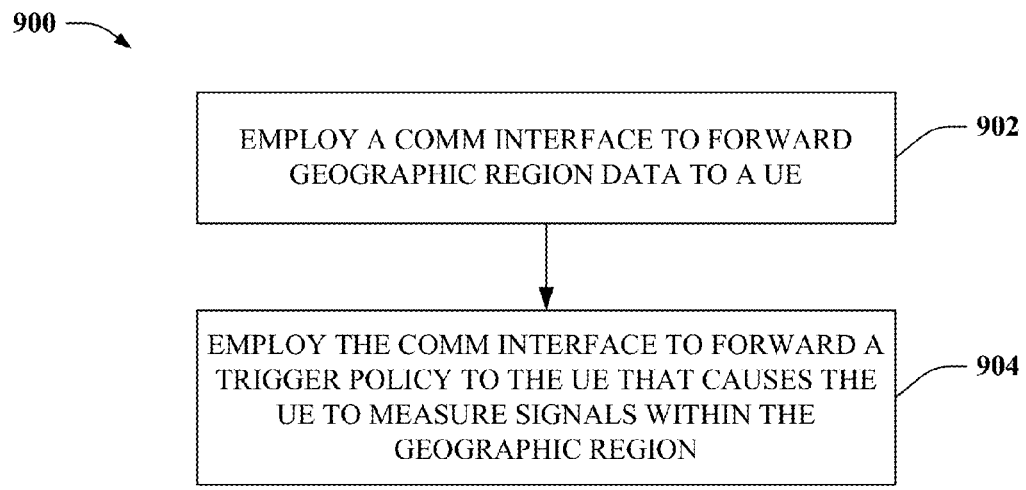
FIG. 9 illustrates a flowchart of an example methodology for improved wireless signal analysis according to some aspects.

FIG. 9 illustrates a flowchart of an example methodology 900 for providing geographic-based downlink signal analysis according to aspects of the subject disclosure. At 902, method 900 can comprise employing a communication interface to forward data defining a geographic region to a UE operating within a wireless network. In at least one aspect of the subject disclosure, the data defines the geographic region with geographic coordinates that are independent of wireless network infrastructure (e.g., network base stations or network cells). At 904, method 900 can comprise employing the communication interface to forward a trigger policy to the UE that causes the UE to measure signals of the wireless network when the UE is within the geographic region and record a set of signal measurements.

In some aspects, it should be appreciated that employing the communication interface can particularly comprise employing the communication interface to forward the data and the trigger policy to the UE via a base station of the wireless network. In at least one aspect, the trigger policy can comprise an explicit command to the UE, whereas in other aspects the trigger policy is an implied command based on forwarding the data defining the geographic region to the UE. In some aspects, the trigger policy can comprise a policy for triggering signal analysis (e.g., signal measurement) or recording of such signal analysis, based on one or more policy conditions in addition to geographic location of the UE. In at least one such aspect, the trigger policy can comprise an explicit trigger command that can cause real-time triggering of the signal analysis or recording based on the one or more policy conditions. In addition to geographic location, the one or more conditions can also comprise available UE battery energy, available storage capacity, available UE memory capacity, a time of day for recording, or the like. In addition, the trigger policy can provide one or more conditions in addition to geographic location for reporting results of the signal analysis and recording, such as time of day for reporting. Thus, as an illustrative example, where the trigger policy states that signal analysis or recording should be initiated when within the geographic region and UE batter power is above a threshold level, the UE will initiate signal measurements and recording thereof, only upon entering the geographic location, and only if UE battery power is above the threshold level. This example is not exclusive, however, as other examples of conditions for the trigger policy are within the scope of the subject disclosure.

Further, employing the communication interface to forward the data defining the geographic region can first comprise employing the communication interface to obtain the data defining the geographic region from a wireless management network related to the wireless network. Moreover, employing the communication interface to forward the data defining the geographic region can also comprise employing an extended control plane protocol of the wireless network, or alternatively can comprise employing a user plane protocol of the wireless network configured to include the data defining the geographic region. In this latter aspect, method 900 can optionally comprise initiating a network server application to generate a set of user plane data packets comprising the data defining the geographic region or the trigger policy. The network server application can then be utilized to send the set of user plane data packets to the UE, and to receive a set of uploaded data packets from the UE comprising the set of signal measurements.

According to still other aspects, method 900 can comprise employing GPS coordinates for the geographic coordinates. In an alternative aspect, however, method 900 can comprise employing geographic latitude and longitude coordinates for the geographic coordinates. According to one specific aspects of the subject disclosure, method 900 can also comprise forwarding a set of data defining a reporting region to the UE, wherein the UE uploads the set of signal measurements only when the UE is within the reporting region. It should be appreciated that method 900 can employ the GPS coordinates, the latitude and longitude coordinates, a suitable set of base station IDs to define the reporting region.

Figure 10:
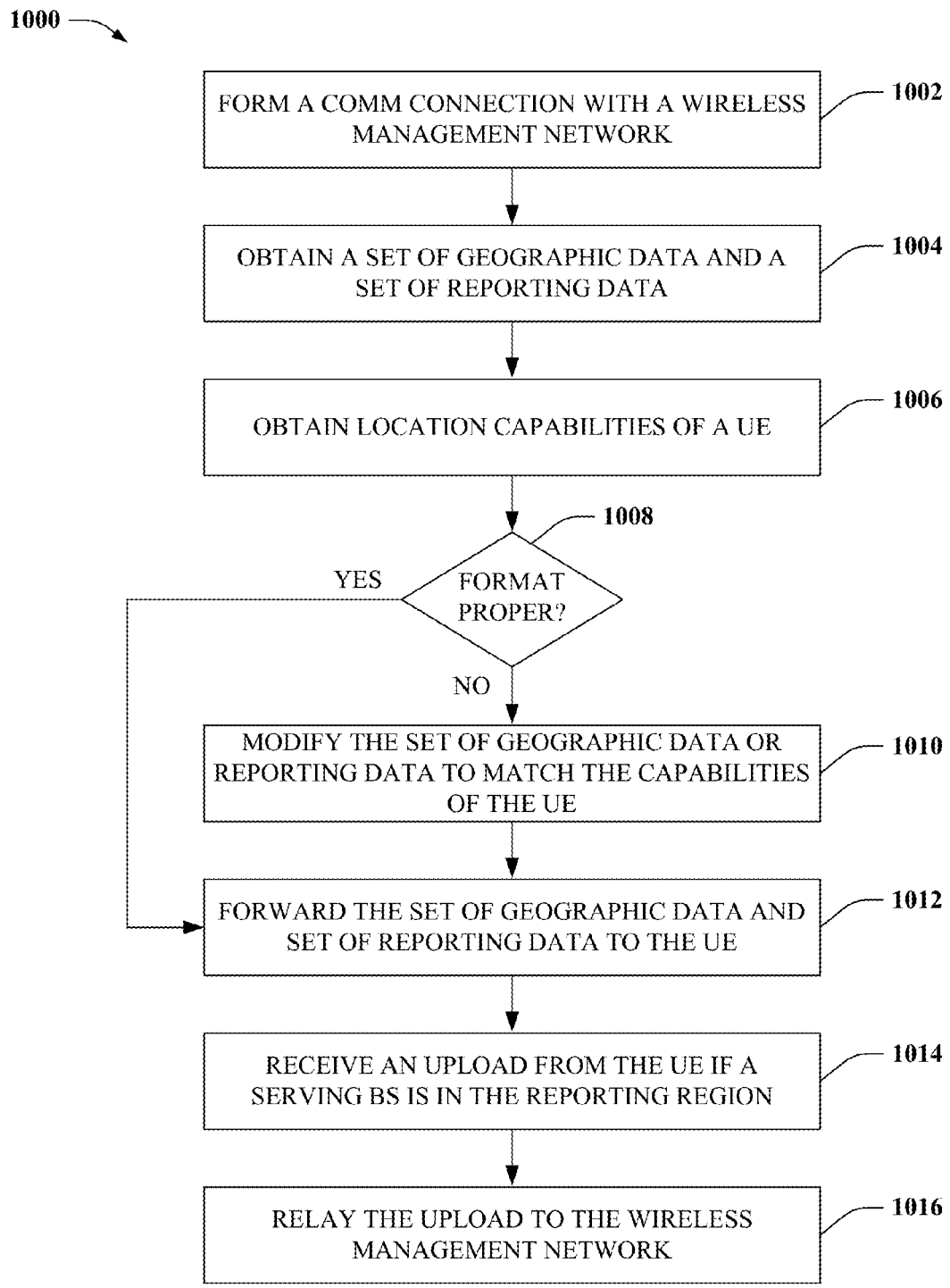
FIG. 10 depicts a flowchart of an example methodology for triggering downlink signal analysis based on network independent geographic coordinates.

FIG. 10 depicts a flowchart of yet another example methodology 1000 according to other aspects of the subject disclosure. At 1002, method 1000 can comprise forming a communication connection with a wireless management network. At 1004, method 1000 can comprise obtaining a set of geographic data defining a geographic region and a set of reporting data defining a reporting region from the wireless management network. Furthermore, at 1006, method 1000 can comprise obtaining location identification capabilities of a UE operating within a wireless network. At 1008, method 1000 can make a determination as to whether the set of geographic data or the set of reporting data is in a format consistent with the location identification capabilities of the UE. If so, method 1000 can proceed to 1012. Otherwise, method 1000 proceeds to 1010.

At 1010, method 1000 can comprise modifying the set of geographic data or the set of reporting data to match the location identification capabilities of the UE. The modifying can further comprise, for instance, converting GPS coordinates into latitude and longitude coordinates, or into a set of base station IDs at least in part overlapping the geographic region defined by the GPS coordinates. Alternatively, the modifying can comprise converting the latitude and longitude coordinates into GPS coordinates or into the latitude and longitude coordinates, and so on.

At 1012, method 1000 can comprise forwarding the set of geographic data and the set of reporting data to the UE. At 1014, method 1000 can comprise receiving an upload from the UE if a serving base station is in the reporting region. At 1016, method 1000 can comprise relaying the upload to the wireless management network.

Figure 11:
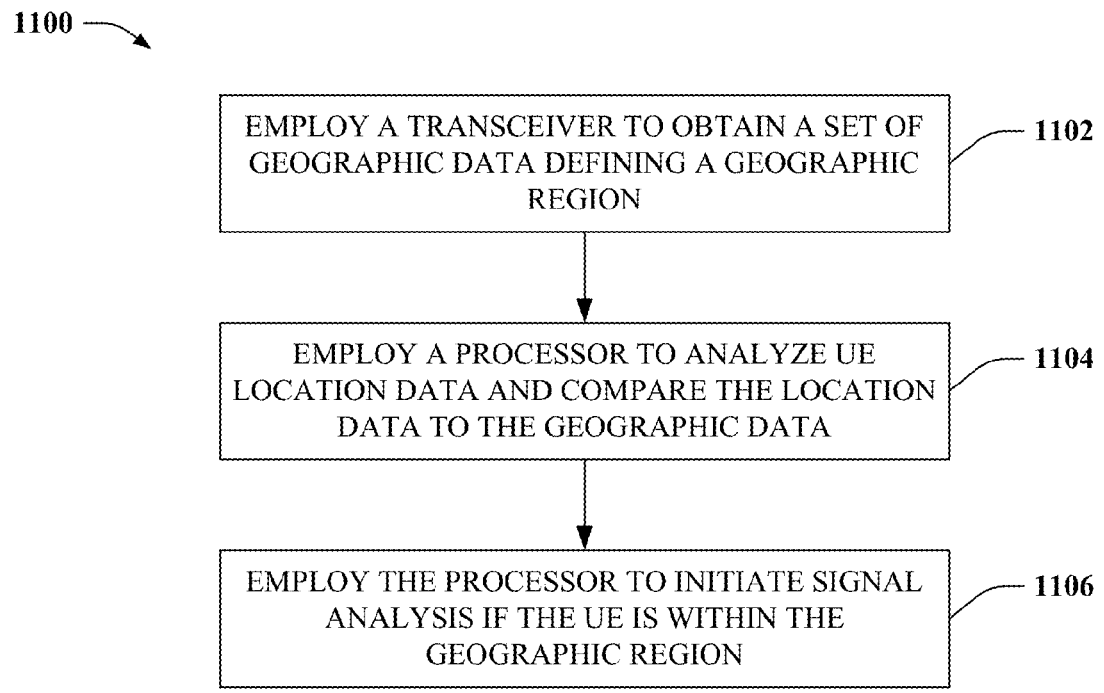
FIG. 11 illustrates a flowchart of an example methodology for targeted signal analysis or reporting according to other aspects.

FIG. 11 depicts a flowchart of an example methodology 1100 for implementing geographic based downlink signal analysis according to still other disclosed aspects. At 1102, method 1100 can comprise employing a wireless transceiver to obtain a set of geographic data that defines a geographic region of a wireless network. Accordingly, the geographic region can be defined with greater resolution than a size of cells of the wireless network, and can therefore define a geographic region that includes subset of one or more of the cells.

As one example of the foregoing, obtaining the set of geographic data can comprise employing a control plane protocol of the wireless network. For instance, the set of geographic data can be within a unicast message targeted for a UE, or within a broadcast message if the UE is in an idle state. In at least one aspect, the geographic data can be independent of base station infrastructure of the wireless network. As an alternative example, obtaining the set of geographic data can comprise employing a user plane protocol, wherein the set of geographic data is included within a payload of one or more data packets generated by a network server. According to this alternative example, method 1100 can further comprise employing a client application to extract the set of geographic data from the one or more data packets.

At 1104, method 1100 can comprise employing a data processor to analyze data indicating a location of a UE and comparing the location to the geographic region. As one particular example, this data indicating the location of the UE can comprise an ID of a base station serving the UE. Moreover, the geographic data that defines the geographic region can also comprise a set of base station IDs of the wireless network.

Further, at 1106, method 1100 can comprise employing the data processor to initiate signal analysis measurements of the wireless network if the UE is within the geographic region and recording a set of signal measurements for uploading to the wireless network. More particularly, measuring signals of the wireless network can further comprises measuring at least one of signal strength, quality of signal strength, quality at signal peak level, call drop rate, setup success rate, or throughput, or the like, or a suitable combination thereof.

According to particular aspects, method 1100 can further comprise obtaining a set of reporting data that defines a reporting region of the wireless network for uploading the set of signal measurements. In such aspects, method 1100 can also comprise refraining from uploading the set of signal measurements to the wireless network unless the UE is within the reporting region. In at least one such aspect, the reporting region comprises a preferred reporting region and a preferred reporting time. In such aspect(s), method 1100 can alternatively comprise refraining from uploading set of signal measurements unless the UE is within the reporting region if the preferred reporting time has not expired. Likewise, if the preferred reporting time has expired, method 1100 can instead comprise uploading the set of signal measurements anywhere within the wireless network.

Figure 12:
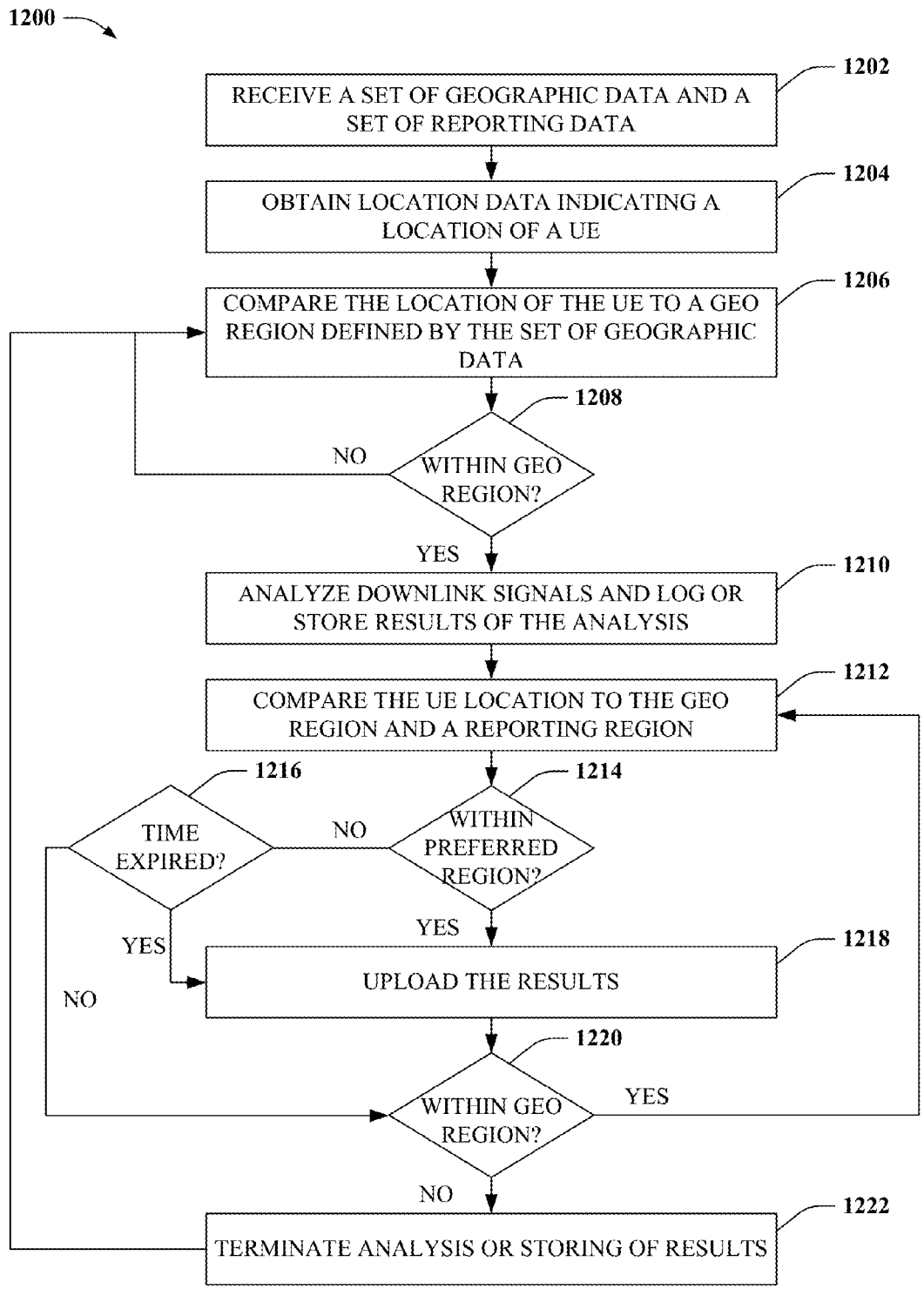
FIG. 12 depicts a flowchart of a sample methodology for triggering signal analysis and measurement reporting based on determined position location.

FIG. 12 illustrates a flowchart of a sample methodology 1200 according to one or more additional aspects of the subject disclosure. At 1202, method 1200 can comprise receiving a set of geographic data and a set of reporting data via a wireless communication. At 1204, method 1200 can comprise obtaining location data indicating a position location of a UE. At 1206, method 1200 can comprise comparing the location of the UE to a geographic region defined by the set of geographic data. At 1208, method 1200 can comprise determining whether the position location of the UE overlaps the geographic region. If the position location of the UE overlaps the geographic region, method 1200 can proceed to 1210. Otherwise, method 1200 returns to reference number 1206.

At 1210, method 1200 can comprise analyzing downlink signals and log or store results of the analyzing. At 1212, method 1200 can comprise comparing the UE location to the geographic region and a reporting region, wherein the reporting region comprises a preferred reporting region and a preferred reporting time. At 1214, method 1200 can comprise determining whether the position location of the UE overlaps the preferred reporting region. If the position location of the UE overlaps the preferred reporting region, method 1200 can proceed to 1218; otherwise method 1200 proceeds to 1216.

At 1216, method 1200 can comprise determining whether the preferred time has expired. If the preferred time has expired, method 1200 can proceed to reference number 1218. Otherwise, method 1200 proceeds to 1220.

At 1218, method 1200 can comprise uploading the results of the analysis. At 1220, method 1200 can comprise determining whether the position location of the UE overlaps the geographic region. If the position location of the UE does overlap the geographic region, method 1200 returns to reference number 1212; otherwise method 1200 proceeds to 1222. At 1222, method 1200 can comprise terminating the analysis or storing of the analysis of the downlink signals, and can return to reference number 1206.

Figure 13:
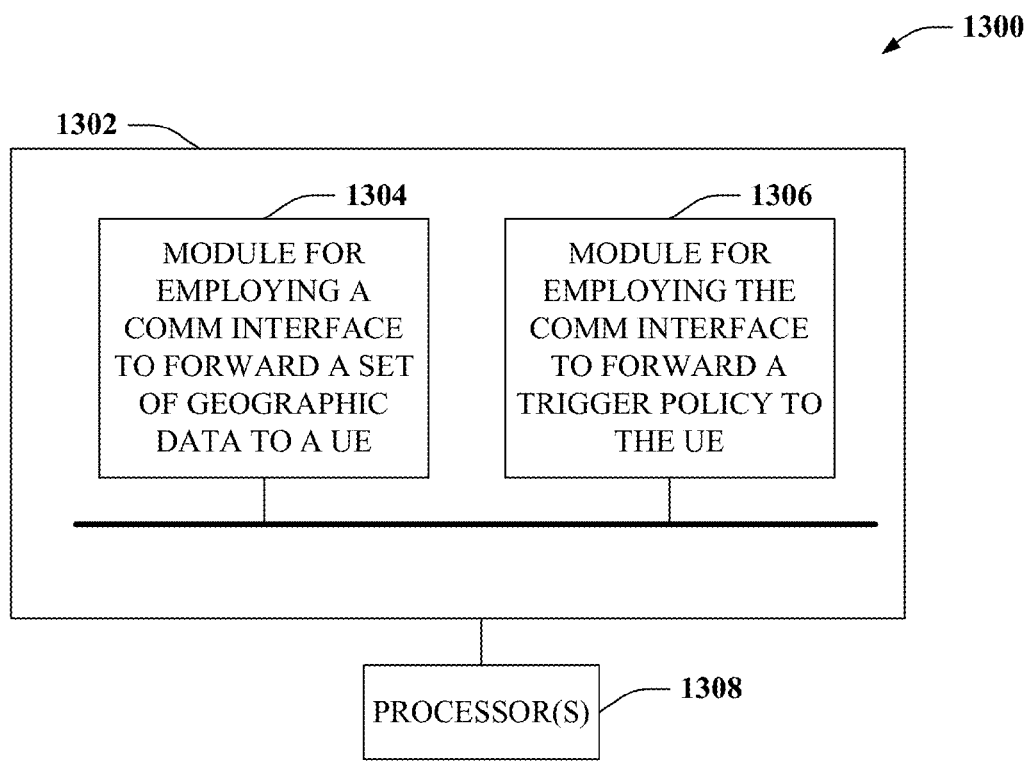
FIG. 13 illustrates a block diagram of an example system that facilitates targeted network signal analysis based on position location.
Figure 14:
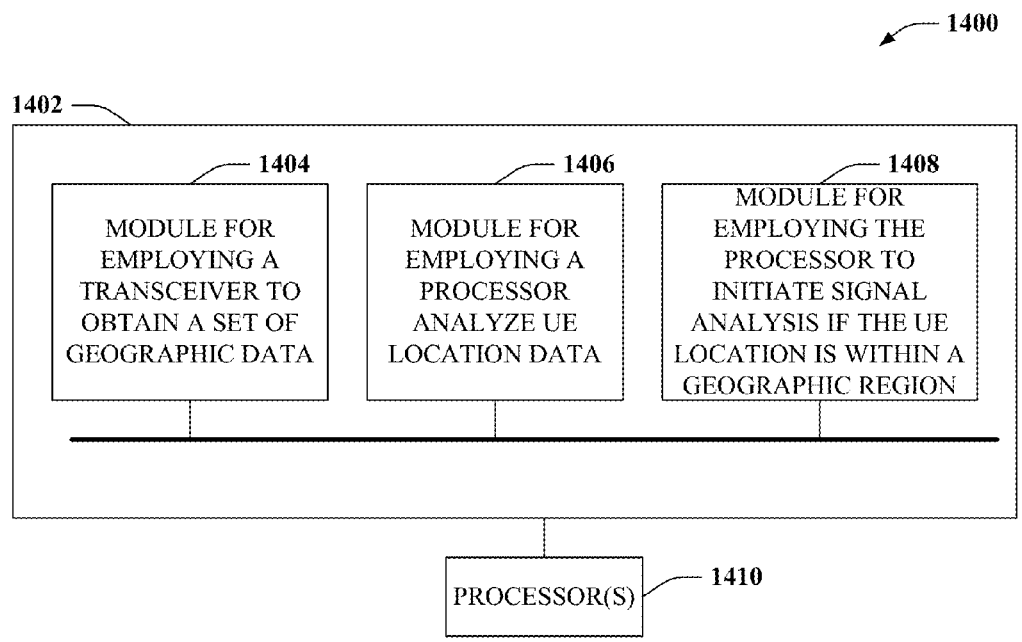
FIG. 14 illustrates a block diagram of an example system that provides targeted network signal analysis based on position location.

FIGS. 13 and 14 illustrate respective example systems 1300, 1400 for implementing improved acknowledgment and re-transmission protocols for wireless communication according to aspects of the subject disclosure. For instance, systems 1300, 1400 can reside at least partially within a wireless communication network and/or within a wireless receiver such as a node, base station, access point, user terminal, personal computer coupled with a mobile interface card, or the like. It is to be appreciated that systems 1300, 1400 are represented as including functional blocks, which can be functional blocks that represent functions implemented by a processor, software, or combination thereof (e.g., firmware).

System 1300 can comprise memory 1302 for storing modules configured to execute functions of system 1300, including managing geographic based signal analysis of a wireless network. Further, system 1300 can comprise a processor 1308 for executing the modules. Particularly, system 1300 comprises a module 1304 that forwards data defining a geographic region to a UE operating within a wireless network. The data defining the geographic region can particularly comprise data that defines the geographic region independent of wireless network infrastructure. Further, system 1300 can comprise a module 1306 that forwards a trigger policy to the UE that causes the UE to measure signals of the wireless network when the UE is within the geographic region and record a set of signal measurements.

System 1400 can comprise memory 1402 for storing modules configured to implement functions of system 1400, and a data processor 1410 for executing the modules, wherein the functions can include determining a position location of system 1400 and recording downlink signal measurements and targeted reporting of such measurements based at least in part on the position location. More particularly, system 1400 can comprise a module 1404 for employing a wireless transceiver of system 1400 to obtain a set of geographic data that defines a geographic region independent of base station infrastructure of a wireless network. Additionally, system 1400 can comprise a module 1406 for employing a data processor to analyze data indicating a location of a UE and comparing the location to the geographic region. Furthermore, system 1400 can comprise a module 1408 for employing data processor 1410 to initiate signal analysis measurements of the wireless network if the UE is within the geographic region and recording a set of signal measurements for uploading to a wireless network.

Figure 15:
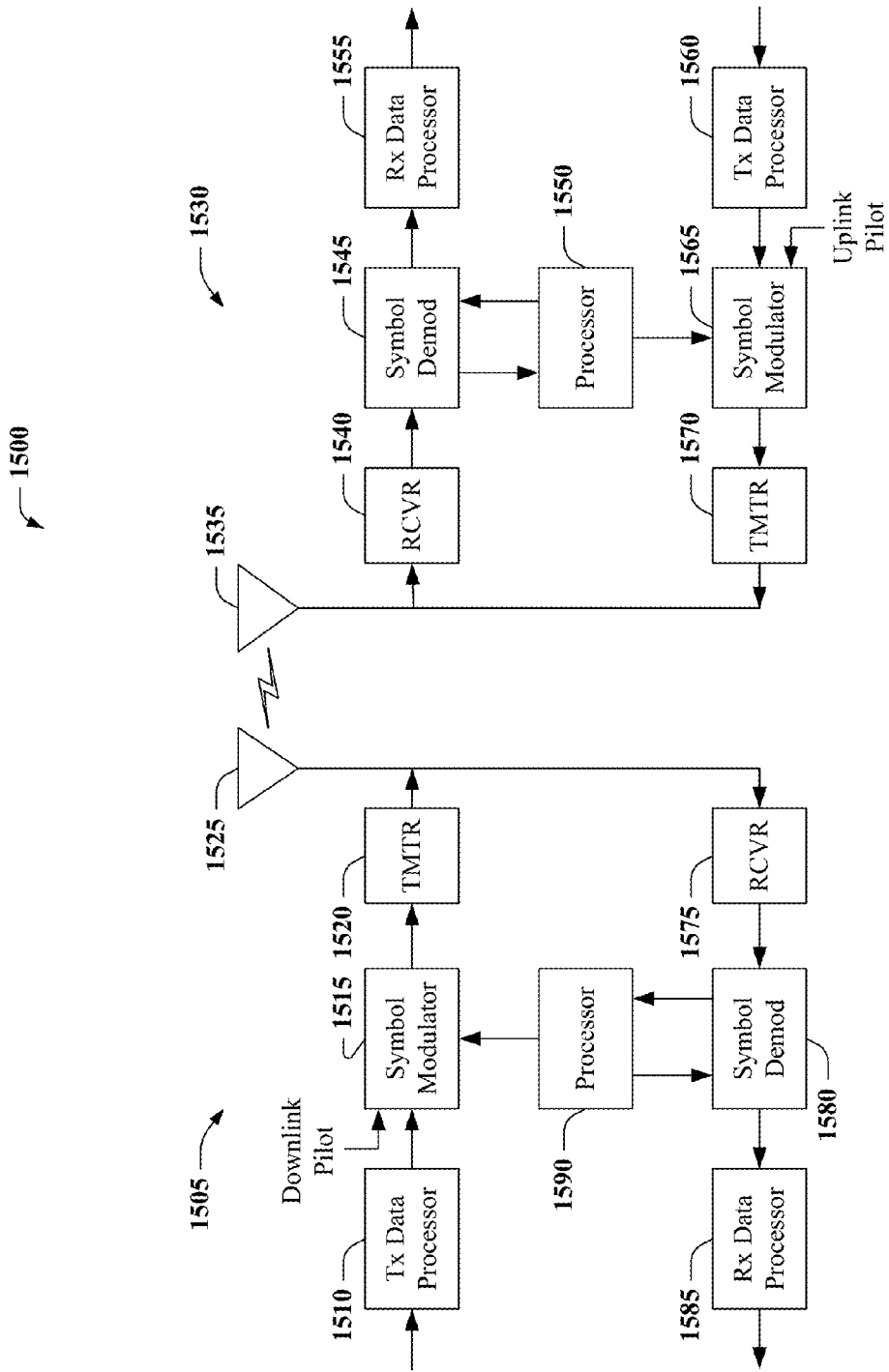
FIG. 15 illustrates a block diagram of a sample wireless communications apparatus employed in implementing various aspects of the subject disclosure.

FIG. 15 depicts a block diagram of an example system 1500 that can facilitate wireless communication according to some aspects disclosed herein. On a downlink, at access point 1505, a transmit (TX) data processor 1510 receives, formats, codes, interleaves, and modulates (or symbol maps) traffic data and provides modulation symbols ("data symbols"). A symbol modulator 1515 receives and processes the data symbols and pilot symbols and provides a stream of symbols. A symbol modulator 1515 multiplexes data and pilot symbols and provides them to a transmitter unit (TMTR) 1520. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1520 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1525 to the terminals. At terminal 1530, an antenna 1535 receives the downlink signal and provides a received signal to a receiver unit (RCVR) 1540. Receiver unit 1540 conditions (e.g., filters, amplifies, and frequency downconverts) the received signal and digitizes the conditioned signal to obtain samples. A symbol demodulator 1545 demodulates and provides received pilot symbols to a processor 1550 for channel estimation. Symbol demodulator 1545 further receives a frequency response estimate for the downlink from processor 1550, performs data demodulation on the received data symbols to obtain data symbol estimates (which are estimates of the transmitted data symbols), and provides the data symbol estimates to an RX data processor 1555, which demodulates (i.e., symbol demaps), deinterleaves, and decodes the data symbol estimates to recover the transmitted traffic data. The processing by symbol demodulator 1545 and RX data processor 1555 is complementary to the processing by symbol modulator 1515 and TX data processor 1510, respectively, at access point 1505.

On the uplink, a TX data processor 1560 processes traffic data and provides data symbols. A symbol modulator 1565 receives and multiplexes the data symbols with pilot symbols, performs modulation, and provides a stream of symbols. A transmitter unit 1570 then receives and processes the stream of symbols to generate an uplink signal, which is transmitted by the antenna 1535 to the access point 1505. Specifically, the uplink signal can be in accordance with SC-FDMA requirements and can include frequency hopping mechanisms as described herein.

At access point 1505, the uplink signal from terminal 1530 is received by the antenna 1525 and processed by a receiver unit 1575 to obtain samples. A symbol demodulator 1580 then processes the samples and provides received pilot symbols and data symbol estimates for the uplink. An RX data processor 1585 processes the data symbol estimates to recover the traffic data transmitted by terminal 1530. A processor 1590 performs channel estimation for each active terminal transmitting on the uplink. Multiple terminals can transmit pilot concurrently on the uplink on their respective assigned sets of pilot sub-bands, where the pilot sub-band sets can be interlaced.

Processors 1590 and 1550 direct (e.g., control, coordinate, manage, etc.) operation at access point 1505 and terminal 1530, respectively. Respective processors 1590 and 1550 can be associated with memory units (not shown) that store program codes and data. Processors 1590 and 1550 can also perform computations to derive frequency and time-based impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1590 and 1550.

Figure 16:
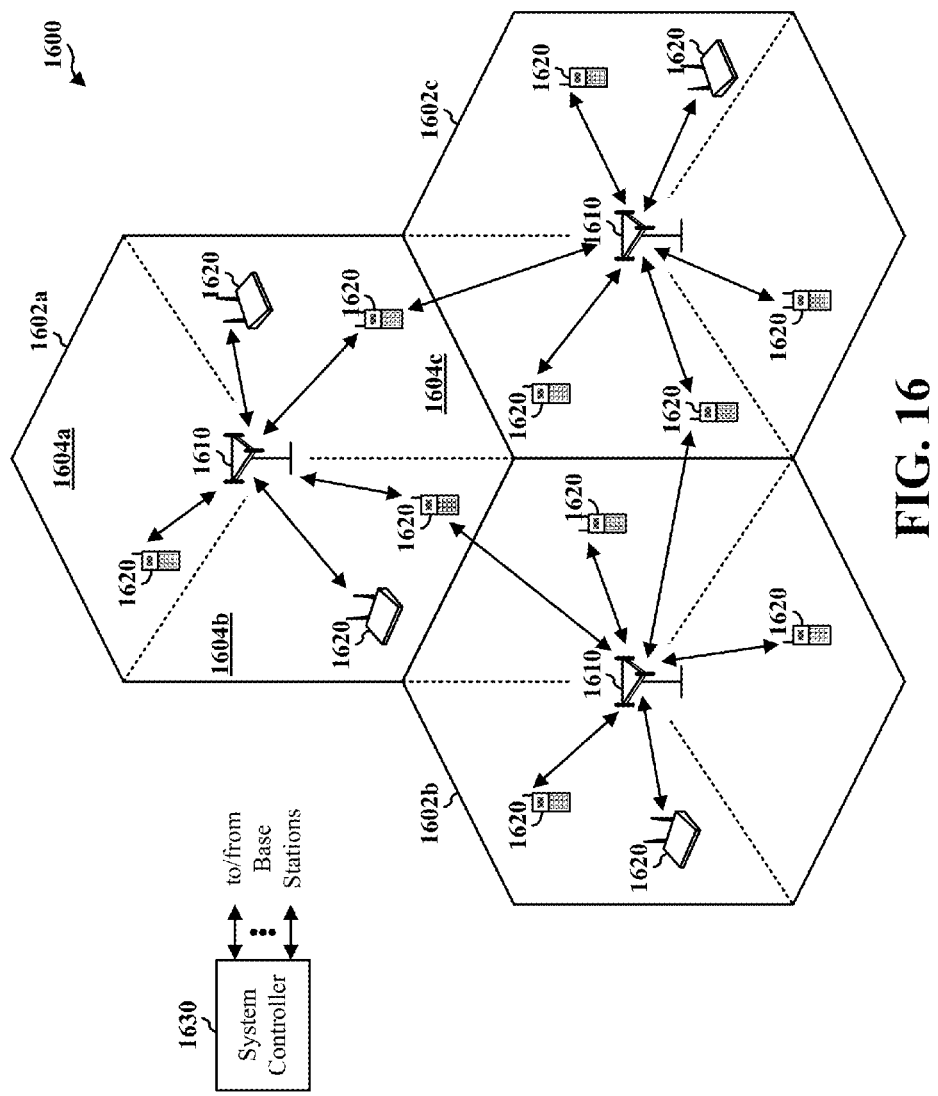
FIG. 16 depicts a block diagram of an example cellular environment for wireless communications according to further aspects.

FIG. 16 illustrates a wireless communication system 1600 with multiple base stations (BSs) 1610 (e.g., wireless access points, wireless communication apparatus) and multiple terminals 1620 (e.g., ATs), such as can be utilized in conjunction with one or more aspects. A BS 1610 is generally a fixed station that communicates with the terminals and can also be called an access point, a Node B, or some other terminology. Each BS 1610 provides communication coverage for a particular geographic area or coverage area, illustrated as three geographic areas in FIG. 16, labeled 1602*a*, 1602*b*, and 1602*c*. The term "cell" can refer to a BS or its coverage area depending on the context in which the term is used. To improve system capacity, a BS geographic area/coverage area can be partitioned into multiple smaller areas (e.g., three smaller areas, according to cell 1602*a* in FIG. 16), 1604*a*, 1604*b*, and 1604*c*. Each smaller area (1604*a*, 1604*b*, 1604*c*) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1620 are typically dispersed throughout the system, and each terminal 1620 can be fixed or mobile. Terminals 1620 can also be called a mobile station, user equipment, a user device, wireless communication apparatus, an access terminal, a user terminal or some other terminology. A terminal 1620 can be a wireless device, a cellular phone, a personal digital assistant (PDA), a wireless modem card, and so on. Each terminal 1620 can communicate with zero, one, or multiple BSs 1610 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1630 couples to base stations 1610 and provides coordination and control for BSs 1610. For a distributed architecture, BSs 1610 can communicate with one another as needed (e.g., by way of a wired or wireless backhaul network communicatively coupling the BSs 1610). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 17:
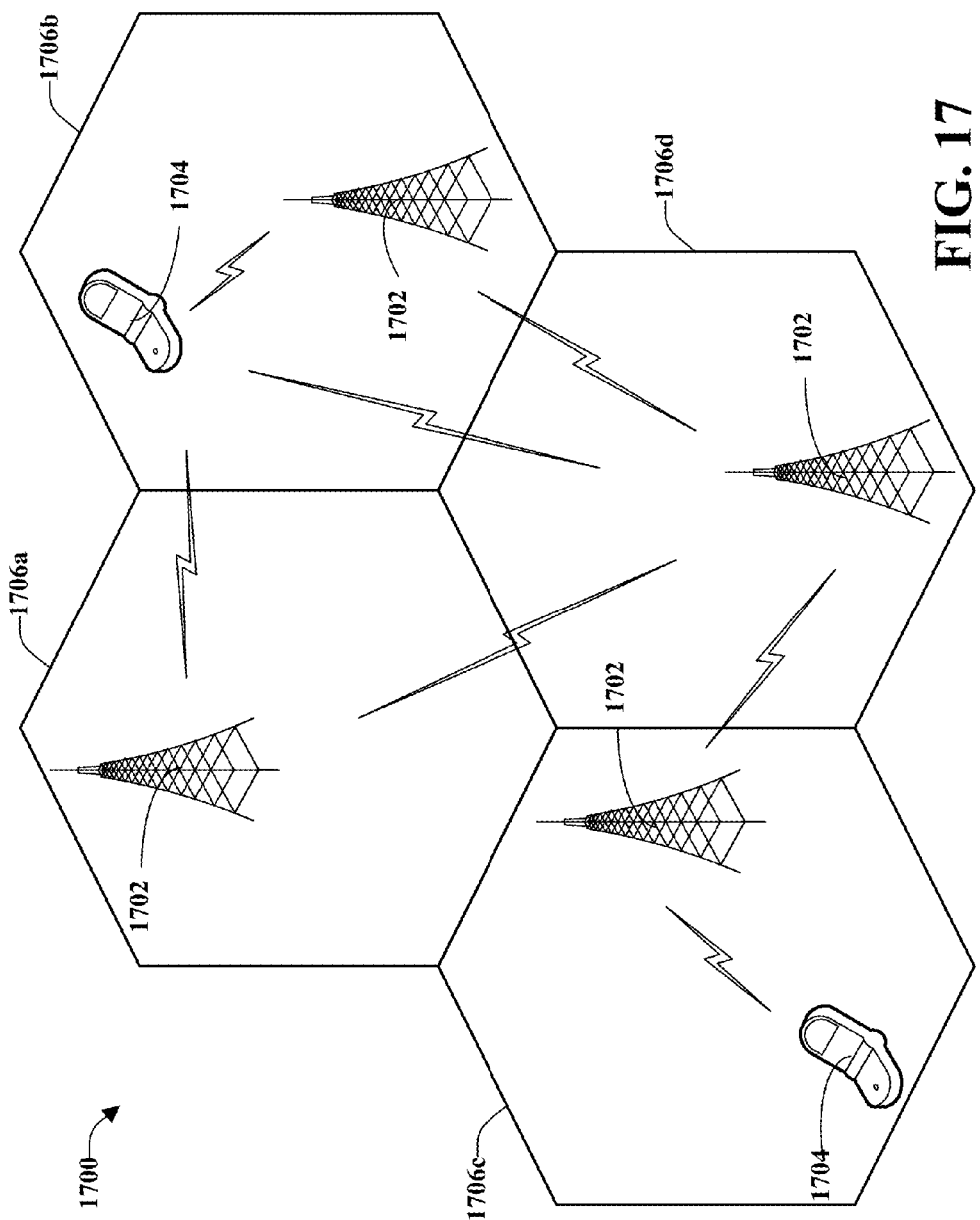
FIG. 17 illustrates a block diagram of an example wireless signaling environment for wireless communications.

FIG. 17 is an illustration of a planned or semi-planned wireless communication environment 1700, in accordance with various aspects. Wireless communication environment 1700 can comprise one or more BSs 1702 in one or more cells and/or sectors that receive, transmit, repeat, etc., wireless communication signals to each other and/or to one or more mobile devices 1704. As illustrated, each BS 1702 can provide communication coverage for a particular geographic area, illustrated as four geographic areas, labeled 1706a, 1706b, 1706c and 1706d. Each BS 1702 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 15, supra), as will be appreciated by one skilled in the art. Mobile devices 1704 can be, for example, cellular phones, smart phones, laptops, handheld communication devices, handheld computing devices, satellite radios, global positioning systems, PDAs, or any other suitable device for communicating over wireless communication environment 1700. Wireless communication environment 1700 can be employed in conjunction with various aspects described herein in order to facilitate automated downlink signal analysis and targeted reporting in wireless communications, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, access terminal (AT), user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communication, comprising:
    forwarding data defining a geographic region from a communication interface to a user equipment operating within a wireless network, wherein the data defines the geographic region with geographic coordinates that are independent of an infrastructure of the wireless network;
    forwarding a trigger policy from the communication interface to the user equipment, the user equipment implementing the trigger policy when the user equipment is within the geographic region to record or log signal measurements of the wireless network and generate a set of signal measurements; and
    forwarding data defining a reporting region from the communication interface to the user equipment that causes the user equipment to upload, in accordance with the trigger policy, the set of signal measurements when the user equipment is within the reporting region.

2. The method of claim 1, further comprising employing the communication interface to forward the data and the trigger policy to the user equipment via a base station of the wireless network.

3. The method of claim 1, further comprising receiving the signal measurements transmitted by the user equipment, wherein the signal measurements comprise strength or quality of signals of the wireless network measured by the user equipment when the user equipment is within the geographic region.

4. The method of claim 1, wherein the trigger policy is an explicit command to the user equipment, or is an implied command based on forwarding the data defining the geographic region to the user equipment.

5. The method of claim 1, wherein the trigger policy specifies one or more conditions on causing the user equipment to record or log signal measurements of the wireless network in addition to the user equipment being within the geographic region, the one or more conditions comprising available battery energy, available storage capacity, available memory capacity, or time.

6. The method of claim 1, further comprising employing the communication interface to obtain the data defining the geographic region from a wireless management network related to the wireless network.

7. The method of claim 1, further comprising employing for the geographic coordinates at least one of:
    geographic positioning system coordinates; or
    geographic latitude and longitude coordinates.

8. The method of claim 1, further comprising employing an extended control plane protocol of the wireless network to forward the data defining the geographic region or the trigger policy to the user equipment.

9. The method of claim 1, further comprising employing a user plane protocol of the wireless network configured to include and forward the data defining the geographic region or the trigger policy to the user equipment.

10. The method of claim 9, further comprising initiating a network server application to generate a set of user plane data packets comprising the data defining the geographic region or the trigger policy and to send the set of user plane data packets to the user equipment, and to receive a set of uploaded data packets from the user equipment comprising the set of signal measurements.

11. The method of claim 1 wherein the uploading of the set of signal measurements is automatically, in accordance with the trigger policy, when the user equipment is within the reporting region.

12. An apparatus configured for wireless communication, comprising:
- a communication interface for electronic communication with a wireless management network and with a wireless transceiver;
- memory for storing wireless protocols for sending data to or receiving data from a user equipment via the wireless transceiver; and
- a data processor for executing modules configured to implement the wireless protocols, the modules comprising:
  - a data management module that obtains or generates a set of geographic data defining a geographic region and a set of reporting data defining a reporting region; and
  - a command module that sends a trigger policy comprising the set of geographic data and the set of reporting data to the user equipment via the wireless transceiver to cause the user equipment to record a set of measurements of wireless network signals when the user equipment is within the geographic region, and upload the set of measurements when the user equipment is within the reporting region, in accordance with the trigger policy.

13. The apparatus of claim 12, further comprising a receiving module that obtains the set of measurements from the user equipment via the wireless transceiver if the wireless transceiver is within the reporting region.

14. The apparatus of claim 12, wherein the set of geographic data defining the geographic region comprises at least one of:
- global positioning system coordinates;
- latitude and longitude coordinates; or
- a set of base station identifiers of a wireless network.

15. The apparatus of claim 12, wherein the set of reporting data defining the reporting region comprises at least one of:
- global positioning system coordinates;
- latitude and longitude coordinates; or
- a set of base station identifiers that includes a base station identifier of the wireless transceiver.

16. The apparatus of claim 12, wherein the set of reporting data defines a preferred reporting region and a default reporting region, further wherein:
- the user equipment refrains from uploading the set of measurements unless the user equipment is within the preferred reporting region before expiration of a preferred reporting time; and
- the user equipment uploads the set of measurements anywhere within the default reporting region if the preferred reporting time has expired.

17. The apparatus of claim 12, wherein the command module further comprises a server application that embeds the set of geographic data and the set of reporting data into application data packets and employs user plane protocols to send the application data packets to the user equipment.

18. The apparatus of claim 12, wherein the command module employs control plane protocols to send the set of geographic data and the set of reporting data to the user equipment.

19. The apparatus of claim 18, wherein the command module:
- employs a unicast message to send the set of geographic data and the set of reporting data to the user equipment if the user equipment has an active wireless connection with the wireless transceiver; or
- employs a broadcast message to send the set of geographic data and the set of reporting data to the user equipment if the user equipment is in an idle state.

20. The apparatus of claim 12, further comprising a version module that queries the user equipment to determine location identification capabilities of the user equipment and obtains a response from the user equipment regarding the location identification capabilities.

21. The apparatus of claim 20, wherein the data management module converts the set of geographic data into a format consistent with the location identification capabilities of the user equipment.

22. The apparatus of claim 21, wherein the format comprises at least one of:
- global positioning system coordinates if the location identification capabilities of the user equipment include global positioning system analysis;
- latitude and longitude coordinates if the location identification capabilities of the user equipment include latitude and longitude analysis; or
- a set of base station identifiers that serve at least a subset of the geographic region if the location identification capabilities of the user equipment are limited to network-based positioning.

23. The apparatus of claim 12 wherein the user equipment automatically uploads the set of measurements when the user equipment is within the reporting region, in accordance with the trigger policy.

24. An apparatus configured for wireless communication, comprising:
- means for forwarding data defining a geographic region via a communication interface to a user equipment operating within a wireless network, wherein the data defines the geographic region independent of an infrastructure of the wireless network;
- means for forwarding a trigger policy via the communication interface to the user equipment that causes the user equipment to record or log signal measurements of the wireless network when the user equipment is within the geographic region and generate a set of signal measurements, in accordance with the trigger policy; and
- means for forwarding data defining a reporting region via the communication interface to the user equipment that causes the user equipment to upload the set of signal measurements when the user equipment is within the reporting region, in accordance with the trigger policy.

25. The apparatus of claim 24, further comprising means for employing the communication interface to forward the data and the trigger policy to the user equipment via a base station of the wireless network.

26. The apparatus of claim 24, further comprising means for receiving the signal measurements transmitted by the user equipment, wherein the signal measurements comprise strength or quality of signals of the wireless network measured by the user equipment when the user equipment is within the geographic region.

27. The apparatus of claim 24, wherein the trigger policy is an explicit command to the user equipment, or is an implied command based on forwarding the data defining the geographic region to the user equipment.

28. The apparatus of claim 24 wherein the forwarding data defining a reporting region via the communication interface to the user equipment causes the user equipment to automatically upload the set of signal measurements when the user equipment is within the reporting region, in accordance with the trigger policy.

29. At least one data processor configured for wireless communication, comprising:
- a module that forwards data defining a geographic region to a user equipment operating within a wireless network, wherein the data defines the geographic region independent of an infrastructure of the wireless network;
- a module that forwards a trigger policy to the user equipment that causes the user equipment to record or log signal measurements of the wireless network when the user equipment is within the geographic region and generate a set of signal measurements; and
- a module that forwards data defining a reporting region to the user equipment that causes the user equipment to upload, in accordance with the trigger policy, the set of signal measurements when the user equipment is within the reporting region.

30. A computer program product, comprising:
- a non-transitory computer-readable medium, comprising:
- code for causing a computer to forward data defining a geographic region to a user equipment operating within a wireless network, wherein the data defines the geographic region independent of an infrastructure of the wireless network;
- code for causing the computer to forward a trigger policy to the user equipment that causes the user equipment to record or log signal measurements of the wireless network when the user equipment is within the geographic region and generate a set of signal measurements; and
- code for causing the computer to forward data defining a reporting region to the user equipment that causes the user equipment to upload, in accordance with the trigger policy, the set of signal measurements when the user equipment is within the reporting region.

31. A method of wireless communication, comprising:
- obtaining, through a wireless transceiver, a trigger policy comprising a set of geographic data defining a geographic region independent of a base station infrastructure of a wireless network;
- analyzing, with a data processor, data indicating a location of a user equipment and comparing the location to the geographic region;
- initiating with the data processor, signal analysis measurements of the wireless network if the user equipment is within the geographic region and recording a set of signal measurements for uploading to a wireless network; and
- obtaining, through a wireless transceiver, a set of reporting data that defines a reporting region of the wireless network for uploading, in accordance with the trigger policy, the set of signal measurements.

32. The method of claim 31, further comprising refraining from uploading the set of signal measurements to the wireless network unless the user equipment is within the reporting region.

33. The method of claim 31, wherein the reporting region comprises a preferred reporting region and a preferred reporting time, and further comprising refraining from uploading the set of signal measurements unless the user equipment is within the reporting region if the preferred reporting time has not expired.

34. The method of claim 33, further comprising uploading the set of signal measurements anywhere within the wireless network if the preferred reporting time has expired.

35. The method of claim 31, wherein the data indicating a location of the user equipment comprises an identifier of a base station serving the user equipment, and further wherein the set of geographic data that defines the geographic region comprises a set of base station identifiers of the wireless network.

36. The method of claim 31, wherein measuring signals of the wireless network further comprises measuring at least one of:
- signal strength;
- quality of signal strength;
- quality at signal peak level;
- call drop rate;
- setup success rate; or
- throughput.

37. The method of claim 31, further comprising employing a control plane protocol for obtaining the set of geographic data.

38. The method of claim 37, further comprising obtaining the set of geographic data within a unicast message targeted for the user equipment or within a broadcast message if the user equipment is in an idle state.

39. The method of claim 31, further comprising employing a user plane protocol for obtaining the set of geographic data, wherein the set of geographic data is included within a payload of one or more data packets generated by a network server.

40. The method of claim 39, further comprising employing a client application to extract the set of geographic data from the one or more data packets, wherein the data processor executes instructions of the client application at least for comparing the location to the geographic region and to initiate signal analysis measurements of the wireless network.

41. An apparatus configured for wireless communication, comprising:
- a communication interface that employs a wireless transceiver for obtaining a trigger policy comprising set of geographic data that defines a geographic region and a set of reporting data that defines a reporting region, wherein the geographic region is at least in part different from the reporting region;
- memory for storing modules configured to provide position dependent signal analysis for the apparatus; and
- a data processor for executing the modules, the modules comprising:
  - a measurement module that performs a data analysis of received wireless signals;
  - a comparison module that monitors data providing a position location of the apparatus and that compares the position location to the geographic region; and
  - a triggering module that causes the measurement module to initiate an analysis of downlink signals when the position location is within the geographic region, in accordance with the trigger policy.

42. The apparatus of claim 41, further comprising a termination module that causes the measurement module to end the analysis of downlink signals when the position location is outside the geographic region.

43. The apparatus of claim 41, further comprising a positioning module that obtains or generates the data providing the position location of the apparatus.

44. The apparatus of claim 43, wherein the positioning module comprises a client application of a global positioning system device that provides global positioning coordinates for the data providing the position location of the apparatus.

45. The apparatus of claim 43, wherein the positioning module comprises a client application of a navigational device that provides latitude and longitude coordinates for the data providing the position location of the apparatus.

46. The apparatus of claim 43, wherein the positioning module employs a base station identifier of a serving base station and infers the position location of the apparatus from the base station identifier.

47. The apparatus of claim 41, wherein the comparison module further compares the position location to the reporting region and determines whether the apparatus is within the reporting region.

48. The apparatus of claim 47, further comprising a reporting module that uploads a set of signal analysis data derived from the data analysis if the apparatus is within the reporting region.

49. The apparatus of claim 47, wherein the reporting region comprises a preferred reporting region and a default reporting region, and a preferred reporting time.

50. The apparatus of claim 49, wherein a reporting module at least one of:
uploads results of the data analysis if the apparatus is within the preferred reporting region; or
refrains from uploading results of the data analysis if the apparatus is not within the preferred reporting region, unless the preferred reporting time has expired and the apparatus is within the default reporting region.

51. The apparatus of claim 41, wherein at least one of:
the communication interface obtains the set of geographic data and the set of reporting data from a control plane protocol of a wireless network; or
the apparatus further comprises a client application that employs a user plane protocol to interface with a network server application, wherein the client application extracts the set of geographic data or the set of reporting data from within user plane data packets provided by the network server application, and generates uplink user plane data packets to send results of the data analysis to the network server application.

52. An apparatus for wireless communication, comprising:
means for obtaining, via a wireless transceiver, a trigger policy comprising a set of geographic data that defines a geographic region independent of a base station infrastructure of a wireless network;
means for analyzing, with a data processor, data indicating a location of a user equipment and comparing the location to the geographic region;
means for initiating, with the data processor, signal analysis measurements of the wireless network if the user equipment is within the geographic region and recording a set of signal measurements for uploading to a wireless network; and
means for obtaining, via the wireless transceiver, a set of reporting data that defines a reporting region of the wireless network for uploading the set of signal measurements, in accordance with the trigger policy.

53. The apparatus of claim 52, further comprising means for refraining from uploading the set of signal measurements to the wireless network unless the user equipment is within the reporting region.

54. The apparatus of claim 52, wherein the reporting region comprises a preferred reporting region and a preferred reporting time, and further comprising means for refraining from uploading the set of signal measurements unless the user equipment is within the reporting region if the preferred reporting time has not expired.

55. The apparatus of claim 54, further comprising means for uploading the set of signal measurements anywhere within the wireless network if the preferred reporting time has expired.

56. At least one processor configured for wireless communication, comprising:
a module that obtains a trigger policy comprising a set of geographic data defining a geographic region independent of a base station infrastructure of a wireless network;
a module that analyzes data indicating a location of a user equipment and comparing the location to the geographic region;
a module that initiates signal analysis measurements of the wireless network if the user equipment is within the geographic region and recording a set of signal measurements for uploading to a wireless network; and
a module that obtains a set of reporting data that defines a reporting region of the wireless network for uploading, in accordance with the trigger policy, the set of signal measurements.

57. A computer program product, comprising:
a non-transitory computer-readable medium, comprising:
code for causing a computer to obtain a trigger policy comprising a set of geographic data that defines a geographic region independent of a base station infrastructure of a wireless network;
code for causing the computer to analyze data indicating a location of a user equipment and comparing the location to the geographic region;
code for causing the computer to initiate signal analysis measurements of the wireless network if the user equipment is within the geographic region and recording a set of signal measurements for uploading to a wireless network; and
code for causing the computer to obtain a set of reporting data that defines a reporting region of the wireless network for uploading, in accordance with the trigger policy, the set of signal measurements.

* * * * *